(12) United States Patent
Ahn et al.

(10) Patent No.: US 12,499,593 B2
(45) Date of Patent: Dec. 16, 2025

(54) METHOD AND APPARATUS FOR TRANSFORMING INPUT IMAGE BASED ON TARGET STYLE AND TARGET COLOR INFORMATION

(71) Applicant: NAVER WEBTOON LTD., Seongnam-si (KR)

(72) Inventors: Namhyuk Ahn, Seongnam-si (KR); Seung Kwon Kim, Seongnam-si (KR); Jihye Back, Seongnam-si (KR); Yong Jae Kwon, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 208 days.

(21) Appl. No.: 18/471,434

(22) Filed: Sep. 21, 2023

(65) Prior Publication Data

US 2024/0112377 A1    Apr. 4, 2024

(30) Foreign Application Priority Data

Sep. 23, 2022    (KR) .................. 10-2022-0120505

(51) Int. Cl.
*G06T 11/00* (2006.01)
*G06F 3/048* (2013.01)
(Continued)

(52) U.S. Cl.
CPC .................. *G06T 11/001* (2013.01)

(58) Field of Classification Search
CPC . G06T 11/001; G06T 5/50; G06T 5/77; G06T 7/33; G06T 7/55;
(Continued)

(56) References Cited

U.S. PATENT DOCUMENTS 11,798,202 B2 * 10/2023 Boscolo ............... G06V 40/165
2018/0278879 A1 * 9/2018 Saban ................... G06T 7/11
(Continued)

FOREIGN PATENT DOCUMENTS

CN    113674159 A    11/2021
JP    2015130589 A    7/2015
(Continued)

OTHER PUBLICATIONS

Junho Cho et al.; PaletteNet: Image Recolorization with Given Color Palette; 2017 IEEE Conference on Computer Vision and Pattern Recognition Workshops (CVPRW), Aug. 24, 2017; https://ieeexplore.ieee.org/document/8014877.
(Continued)

*Primary Examiner* — Wesner Sajous
(74) *Attorney, Agent, or Firm* — Greer Burns & Crain Ltd.

(57) ABSTRACT

An image transformation method includes receiving an input image, a target style and target color information; generating a texture-transformed image in which the input image is transformed to a texture corresponding to the target style and a color-transformed image in which the input image is transformed to a color corresponding to the target color information, using a pretrained transformation model; and synthesizing the texture-transformed image and the color-transformed image to generate a result image in which the input image is transformed according to the target style and the target color information.

19 Claims, 15 Drawing Sheets

(51) Int. Cl.
*G06F 16/58* (2019.01)
*G06N 20/00* (2019.01)
*G06T 5/50* (2006.01)
*G06T 15/04* (2011.01)
*G06V 10/10* (2022.01)
*G06V 20/10* (2022.01)
*G09G 5/02* (2006.01)
*G09G 5/10* (2006.01)
*H04N 1/60* (2006.01)

(58) Field of Classification Search
CPC . G06T 2207/20092; G06T 2207/20084; G06T 5/006–08; G06T 5/40; G06T 15/04; G06T 15/60; G06T 2215/00; G06T 2200/24; G06V 10/10; G06V 10/44; G06V 10/16; G06V 10/75; G06V 10/761; G06V 10/766; G06V 20/10; G06V 20/56; G06V 20/52; G06V 20/64; G06N 20/00; G06F 16/58; G06F 3/0346; G06F 3/048; G06F 3/0482; G09G 5/02; G09G 5/06; G09G 5/10; G09G 5/028; G09G 5/30; G09G 2320/02; G09G 2320/06; G09G 2320/0271; G09G 2320/0276; G09G 3/2003; G09G 3/3607; G06Q 30/021; H04N 1/58; H04N 1/60; H04N 1/6019; H04N 1/6027; H04N 5/445; H04N 5/57–58
See application file for complete search history.

(56) References Cited

U.S. PATENT DOCUMENTS

| | | | |
|---|---|---|---|
| 2018/0357800 A1* | 12/2018 | Oxholm | G06T 11/001 |
| 2019/0026870 A1* | 1/2019 | Hu | G06T 5/77 |
| 2021/0019866 A1* | 1/2021 | Hu | G06T 11/00 |
| 2022/0386759 A1* | 12/2022 | Fu | G06T 17/205 |
| 2023/0126800 A1* | 4/2023 | Chen | G06V 10/82 382/108 |
| 2024/0020810 A1* | 1/2024 | Li | G06T 5/50 |
| 2025/0165995 A1* | 5/2025 | Hamedi | G06V 10/761 |

FOREIGN PATENT DOCUMENTS

| | | |
|---|---|---|
| JP | 2020526809 A | 8/2020 |
| KR | 1020090111939 A | 10/2009 |
| KR | 1020140054733 A | 5/2014 |
| KR | 1020200071031 A | 6/2020 |
| KR | 1020210028401 A | 3/2021 |

OTHER PUBLICATIONS

Huiwen Chang et al.; Palette-based photo recoloring; ACM Transactions on Graphics , Jul. 27, 2015, 34(4) , pp. 1-11 , https://doi.org/10.1145/2766978.

Japanese Office Action issued in corresponding Japanese patent application No. 2023-151928, dated Sep. 3, 2024.

Office Action issued in corresponding Korean patent application No. 10-2022-0120505, dated Oct. 31, 2023.

* cited by examiner

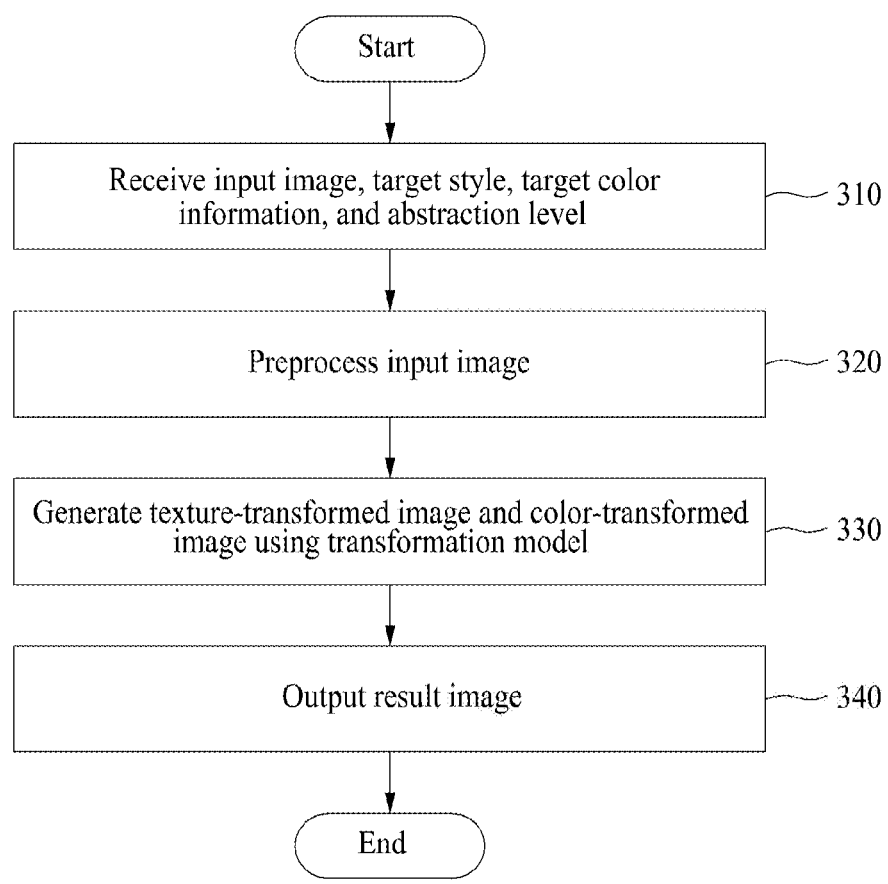

METHOD AND APPARATUS FOR TRANSFORMING INPUT IMAGE BASED ON TARGET STYLE AND TARGET COLOR INFORMATION

CROSS-REFERENCE TO RELATED APPLICATION(S)

This U.S. non-provisional application claims the benefit of priority under 35 U.S.C. § 119 to Korean Patent Application No. 10-2022-0120505 filed on Sep. 23, 2022, in the Korean Intellectual Property Office (KIPO), the entire contents of which are incorporated herein by reference.

BACKGROUND OF THE INVENTION

Field of Invention

One or more example embodiments of the present invention in the following description relate to a method and an apparatus for transforming an input image according to an input target style and target color information and, more particularly, to a method and an apparatus for generating a result image that represents a texture corresponding to a target style and a color corresponding to target color information from an input image, using a pretrained transformation model.

Description of Related Art

Interest in services that provide online contents including images or videos, such as animations, cartoons, and webcomic services, is increasing. An image or a video included in such content has a specific texture or a specific style that reflects a unique style of a creator or a content producer.

A creator or a producer of content desires to transform a general image, such as a photo, to an image that reflects a specific style. In particular, the creator of content may desire to use a general image transformed to a particular style of content rather than directly drawing a background in order to generate an image of content corresponding to a complex background. Similarly, a user that consumes the content may also desire to acquire an image that reflects a specific style of content from an image possessed by the user for secondary consumption.

Here, beyond simply transforming an input image from the user to an image that reflects a specific style of content, there is a need to acquire a result image that meets detailed requirements of the user by further applying color information (or impression of color) or a degree of abstraction that is additionally input from the user.

Korean Patent Laid-Open Publication No. 10-2009-0111939, published on Oct. 28, 2009, describes a method and apparatus for separating a foreground and a background from an image, a method and apparatus for separating a foreground and a background from an image and substituting the separated background, and a computer-readable recording medium recording a program to implement the method.

The aforementioned information is merely provided to assist understanding and may include contents that do not form a portion of the related art and may not include what the related art may present to those skilled in the art.

BRIEF SUMMARY OF THE INVENTION

One or more example embodiments may provide an image transformation method including receiving an input image and a target style, and target color information for transformation; generating a texture-transformed image in which the input image is transformed to a texture corresponding to the target style and a color-transformed image in which the input image is transformed to a color corresponding to the target color information, using a pretrained transformation model; and synthesizing the texture-transformed image and the color-transformed image to generate a result image in which the input image is transformed according to the target style and the target color information.

According to an aspect of at least one example embodiment, there is provided an image transformation method performed by a computer system, the image transformation method including receiving an input image, a target style to which the input image is to be transformed, and target color information to which the input image is to be transformed; generating a texture-transformed image in which the input image is transformed to a texture corresponding to the target style and a color-transformed image in which the input image is transformed to a color corresponding to the target color information, using a pretrained transformation model; and synthesizing the texture-transformed image and the color-transformed image to generate a result image in which the input image is transformed according to the target style and the target color information.

The transformation model may be pretrained to transform the input image to represent the texture corresponding to the target style and the color corresponding to the input target color information without receiving an input of a reference image that represents the target style.

The target color information may include a palette including a group of a plurality of different colors determined based on a color distribution of the input image.

Each of the plurality of colors may be configured to be selectable by a user.

The target style may represent content that includes an image or a video, and the texture corresponding to the target style may be a texture of the image or the video included in the content.

The receiving of the input image, the target style and the target color information may include receiving an abstraction level for setting a degree of abstraction to be represented by the result image, and the generating of the texture-transformed image may include generating the texture-transformed image by transforming the input image to the texture corresponding to the target style that reflects the degree of abstraction represented by the abstraction level.

The image transformation method may further include, as an operation of preprocessing the input image, transforming the input image to a first transformation image that is an image of a Lab color space; generating a first color map by performing simplification processing on the input image; generating a second color map by transforming a color of the first color map based on the target color information; and transforming the second color map to a second transformation image that is an image of the lab color space. The first transformation image and the second transformation image may be input to the transformation model, and the generating may include generating, by the transformation model, the texture-transformed image based on the first transformation image and generating the color-transformed image based on the second transformation image.

The generating may include, by the transformation model, encoding the first transformation image using an encoder; generating the texture-transformed image by decoding the encoded first transformation image using a texture decoder; and generating the color-transformed image by decoding the encoded first transformation image based on the second transformation image using a color decoder.

The texture-transformed image may be an image of an L component as an image of a Lab color space, and the color-transformed image may be an image of an ab component as the image of the Lab color space, and the synthesizing may include generating a composite image by synthesizing the image of the L component and the image of the ab component; and transforming the composite image to an image of an RGB color space.

The transformation model may include a degree-of-abstraction module configured with a plurality of layers, each layer that generates an output value of reflecting a degree of abstraction represented by each abstraction level, and the generating may include generating the texture-transformed image by transforming the input image to the texture corresponding to the target style that reflects the degree of abstraction represented by the received abstraction level, using an output value of a layer of the degree-of-abstraction module corresponding to the received abstraction level.

The transformation model may be pretrained using first training data generated by performing data augmentation on at least one first image that includes the texture corresponding to the target style and second training data generated by performing data augmentation on at least one second image that is a target image for transformation to the target style and color transformation.

The first training data may include an image on which at least one of resizing processing and resolution change processing is performed, to simulate a desired degree of abstraction processing for the first image.

The second training data may include a transformation image for training in which the second image is color-transformed to an arbitrary color.

The transformation image for training may be generated by transformation operations, and the transformation operations may include an operation of transforming at least one of the second image and a color map of the second image generated by performing simplification processing on the second image to an image of a hue saturation value (HSV) color space; and an operation of color-transforming the image of the HSV color space to an arbitrary color.

The transformation operations may include an operation of transforming at least one of the second image and the color map of the second image to an image of a Lab color image; an operation of extracting L information of the image of the Lab color image; an operation of transforming the image of the HSV color space that is color-transformed to the arbitrary color to the image of the Lab color image; and an operation of substituting L information of the transformed image of the Lab color space with the extracted L information.

The transformation model may be pretrained using an image acquired by transforming the first training data to an L component of an image of a Lab color space, an image acquired by transforming the second image to the image of the Lab color space, an image acquired by transforming an image in which the second image is color-transformed to the arbitrary color to an image of an ab component of the Lab color space, and an image acquired by transforming a color map of the second image to the image of the Lab color space.

According to another aspect of at least one example embodiment, there is provided a computer system to perform an image transformation method, the computer system including at least one processor configured to execute an instruction readable in the computer system. The at least one processor is configured to receive an input image, a target style to which the input image is to be transformed, and target color information to which the input image is to be transformed, to generate a texture-transformed image in which the input image is transformed to a texture corresponding to the target style and a color-transformed image in which the input image is transformed to color corresponding to the target color information, using a pretrained transformation model, and to synthesize the texture-transformed image and the color-transformed image to generate a result image in which the input image is transformed according to the target style and the target color information.

According to an aspect of at least one example embodiment, there is provided a method of training a transformation model that transforms an image, performed by a computer system, the method including acquiring training data by performing data augmentation on at least one image that includes a texture corresponding to a target style and at least one second image that is a target image for transformation to the target style and color transformation; and training the transformation model to generate a texture-transformed image in which the second image is transformed to the texture corresponding to the target style and a color-transformed image in which the second image is transformed to a color corresponding to target color information, using the training data. A result image in which the second image is transformed according to the target style and the target color information is generated by synthesizing the texture-transformed image and the color-transformed image, and the trained transformation model is configured to transform an input image to represent the texture corresponding to the target style and the color corresponding to the input target color information without receiving an input of a reference image that represents the target style.

According to some example embodiments, it is possible to acquire a result image representing a texture corresponding to a target style and a color corresponding to target color information input from a user from an input image, using a trained transformation model.

According to some example embodiments, it is possible to acquire a result image representing a texture of a target style and a color of target color information while reflecting an abstraction level for setting a degree of abstraction to be represented by a result image input from a user, using a transformation model.

According to some example embodiments, without receiving an input of a reference image that represents a target style, it is possible to acquire a result image using a pretrained transformation model to transform an input image to represent a texture corresponding to the target style and a color corresponding to target color information.

According to some example embodiments, it is possible to reduce the amount of time and the resources for producing a background portion (i.e., portions other than the foreground portion, such as a character), when producing content, such as a webcomic, a cartoon, and an animation, by acquiring, from an input image, and using a result image that reflects target color information and an abstraction level user may control, using a trained transformation model.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 3 is a flowchart illustrating an image transformation method for generating a result image in which an input image is transformed based on a target style and target color information according to at least one example embodiment;

Figure 1:
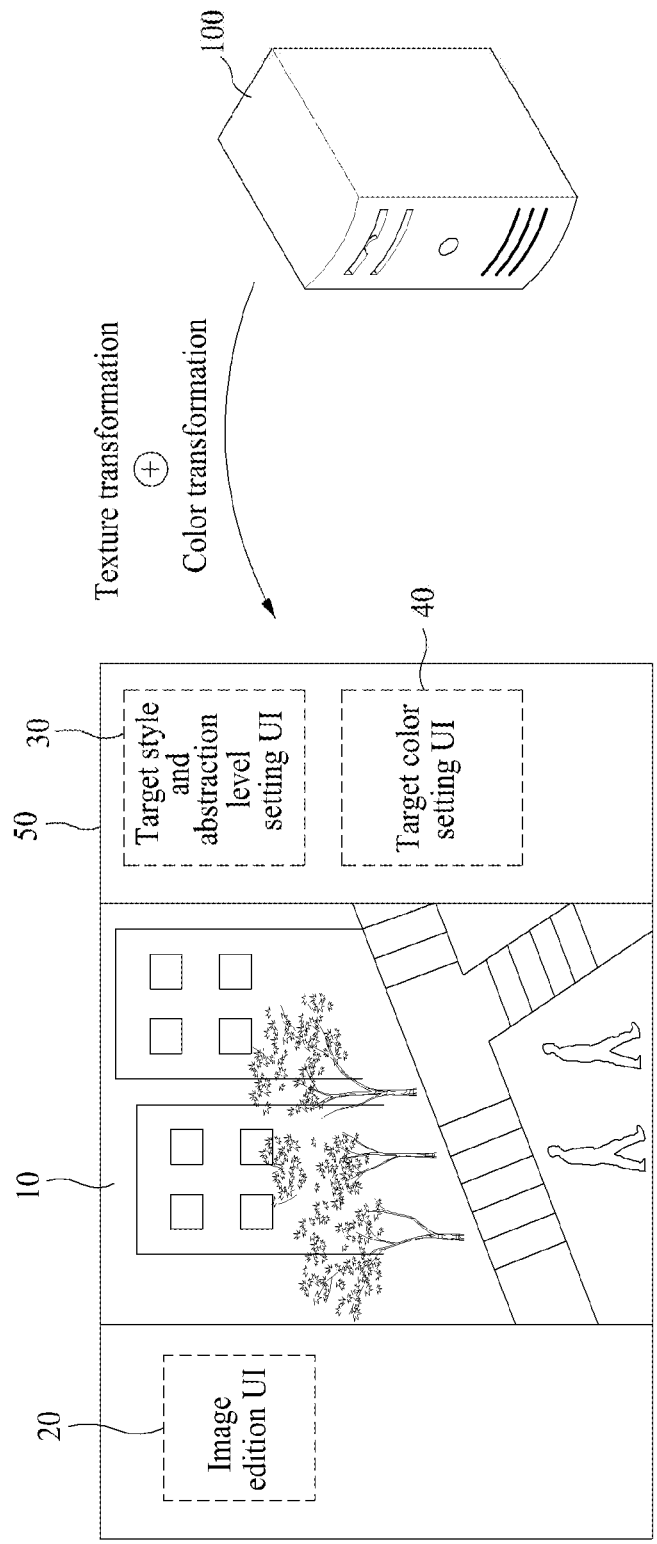
FIG. 1 illustrates an image transformation method for generating a result image in which an input image is transformed based on a target style and target color information according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different from that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an image transformation method for generating a result image in which an input image is transformed based on a target style and the target color information according to at least one example embodiment.

A method of receiving, from a user, an image (hereinafter, an input image), a target style, target color information, and an abstraction level, and transforming the input image to a result image that reflects the target style, the target color information and the abstraction level, that is, a method of generating the result image is described with reference to FIG. 1.

The image may include a photo or other images. In an example embodiment, the image may represent a picture image. However, the image may be interpreted as encompassing a video without being limited to the picture image.

A screen 50 may be a screen of a user terminal for displaying an input image that is input from a user and displaying a result image in which the input image is transformed according to settings of the user. That is, the screen 50 may be an execution screen of software, a program, or an application that performs an image transformation method of an example embodiment.

The user terminal may be a smart device such as a smartphone, a personal computer (PC), a notebook computer, a laptop computer, a tablet, an Internet of things (IoT) device, and a wearable computer.

Referring to FIG. 1, the screen 50 may include, for example, a first area 10 for displaying the input image that is input from the user and the result image that is a result of transforming the input image, a second area 20 including a user interface (UI) for editing an image displayed in the first area 10, and a third area (30, 40) including a UI that allows the user to set at least one of a target style, target color information, and an abstraction level. The third area (30, 40) may include an area 30 including a UI for setting the target style to which the input image is to be transformed and a UI for setting the abstraction level for setting a degree of abstraction to be represented by the result image. Also, the third area (30, 40) may include an area 40 including a UI for setting the target color information to which the input image is to be transformed.

For example, the input image input from the user may be displayed in the first area 10. The user may display the input image in the first area 10 by loading an image stored in the user terminal or an image captured with a camera of the user terminal. The input image is an image before transformation and may also be referred to as an "original image." According to the image transformation method of the example embodiment, the input image may be transformed to the "result image" and the result image may also be displayed in the first area 10. The result image may be displayed in the first area 10 instead of the input image.

The second area 20 may include an editing tool, such as a brush and/or an eraser, as a UI for editing the input image or the result image displayed in the first area 10. Also, the second area 20 may include a UI for undo and redo. The second area 20 may further include a UI for switching between displaying of the input image and displaying of the result image in the first area 10.

The area 30 in the third area (30, 40) may include a UI for setting the target style. The target style may represent content that includes an image or a video. That is, the target style may be expressed with "content name." The content may be, for example, an animation, a cartoon, and a webcomic. The target style may represent a texture to which the input image is to be transformed. That is, the texture of the input image may be transformed to a texture corresponding to the target style through the image transformation method of the example embodiment. Here, the texture corresponding to the target style may be a texture of the image or the video included in the content. The texture may include a painting style of the image or the video, a drawing style thereof, or a feature for visually distinguishing the content from other contents. For example, the user may select a specific webcomic name as the target style through the area 30 and may transform the texture of the input image to a texture of the corresponding webcomic through the image transformation method of the example embodiment.

The area 30 may include a UI for setting an abstraction level that represents a degree of abstraction to be represented by the result image. The "abstraction" may represent how much detail the result image includes, the thickness of a line that represents the result image, and the like. Alternatively, the "abstraction" may represent how much the result image may be simplified. For example, the higher the degree of abstraction, the less detail the result image may include. Alternatively, a line in the result image may be expressed to be blurry or soft. In contrast, the lower the degree of abstraction, the more detail the result image may include, or the result image may be expressed more precisely. In an example embodiment, since the abstraction level is set through the area 30, the degree of abstraction of the result image may be adjusted according to the set abstraction level.

The area 40 in the third area (30, 40) may include a UI for setting target color information. The target color information may represent a color to which the input image is to be transformed. That is, through the image transformation method of the example embodiment, a color of the input image may be transformed to a color corresponding to the target color information. The color corresponding to the target color information may represent impression of color of the result image. For example, the user may select a specific color (hue and saturation) through the area 40 and may transform a color of the input image to the selected color through the image transformation method of the example embodiment. Therefore, the result image may have the same impression of color corresponding to the target color information selected through the area 40.

Therefore, through the image transformation method of the example embodiment, the input image may be transformed to the result image by reflecting the set target style, the set target color information, and the set abstraction level based on information set through the third area (30, 40).

The image transformation method of the example embodiment may be performed by the user terminal that outputs the screen 50. Alternatively, the image transformation method may be performed by a computer system that communicates with the user terminal and is separate from the user terminal. For example, the image transformation method may be performed by a server.

In the following description, the computer system that performs the image transformation method is referred to as a computer system 100.

In an example embodiment, the computer system 100 may transform the input image to the result image using a pretrained transformation model. Here, the computer system 100 may transform the texture of the input image to a texture corresponding to the set target style (1), and may also transform a color of the input image to a color of the set target color information (2). The transformation model may perform texture transformation of the input image of (1) and color transformation of the input image of (2) through the respective processes. Therefore, the computer system 100 may generate a texture-transformed image in which the input image is transformed to the texture corresponding to the target style and may also generate a color-transformed image in which the input image is transformed to the color corresponding to the target color information, using the transformation model, and may generate the result image by synthesizing the texture-transformed image and the color-transformed image.

A method of performing texture transformation of the input image and color transformation of the input image and a method of generating the result image using the transformation model are further described in detail with reference to FIGS. 2 to 13.

Figure 2A:
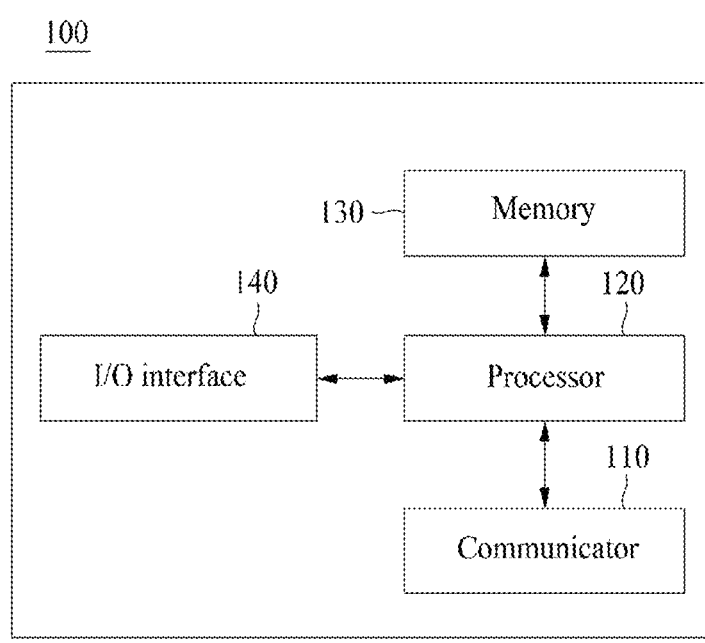
FIG. 2A is a block diagram illustrating a computer system to perform an image transformation method according to at least one example embodiment.

FIG. 2A is a diagram illustrating a computer system to perform an image transformation method according to at least one example embodiment.

The computer system 100 may be a computing device that performs a task required to perform the image transformation method of the example embodiment.

The computer system 100 may be configured to include at least one computing device. The computer system 100 may perform texture transformation of an input image and color transformation of the input image using a pretrained transformation model and may generate a result image that reflects settings from the user.

The computer system 100 may be the aforementioned user terminal or may be another computer apparatus or a server that communicates with the user terminal.

Referring to FIG. 2A, the computer system 100 may include a memory 130, a processor 120, a communicator 110, and an input/output (I/O) interface 140.

The memory 130 may include a permanent mass storage device, such as random access memory (RAM), read only memory (ROM), and a disk drive, as a non-transitory computer-readable record medium. Here, ROM and the permanent mass storage device may be included as a permanent storage device separate from the memory 130. Also, an operating system (OS) and at least one program code may be stored in the memory 130. Such software components may be loaded from another non-transitory computer-readable record medium separate from the memory 130. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 130 through the communicator 110, instead of the non-transitory computer-readable record medium.

The processor 120 may be configured to process instructions of a computer program by performing arithmetic operations, logic operations, and I/O operations. The computer-readable instructions may be provided from the memory 130 or the communicator 110 to the processor 120. For example, the processor 120 may be configured to execute received instructions in response to the program code stored in the memory 130.

The communicator 110 may be a component for communication between the computer system 100 and another apparatus (e.g., user terminal or another server). That is, the communicator 110 may be a hardware module, such as an antenna, a data bus, a network interface card, a network interface chip, and a network interface port of the computer system 100, or a software module, such as a network device driver or a networking program, configured to transmit/receive data and/or information to/from another apparatus.

The I/O interface 140 may be a device used for interfacing with an input device, such as a keyboard, a mouse, etc., and an output device, such as a display, a speaker, etc.

The processor 120 may manage components of the computer system 100, may execute a program or an application for performing the aforementioned preprocessing and pair determination and matching of similar components and may process an operation required for executing the program or the application and processing data. The processor 120 may be at least one processor (central processing unit (CPU) or graphics processing unit (GPU)) of the computer system 100 or may be at least one core in the processor.

Also, in some example embodiments, the computer system 100 and the processor 120 may include greater or smaller number of components than the number of components shown in FIG. 2A. For example, the processor 120 may include components configured to perform functions of training a transformation model and performing an image transformation method of an example embodiment using the trained transformation model. The components of the processor 120 may be a portion of the processor 120 or a function implemented by the processor 120. The components included in the processor 120 may be representations of different functions performed by the processor 120 in response to a control instruction according to a code of an OS or a code of at least one computer program.

A method of performing, by the computer system 100, texture transformation of an input image and color transformation of the input image using a transformation model and a method of generating a result image are further described with reference to FIG. 2B to FIG. 13.

Figure 2B:
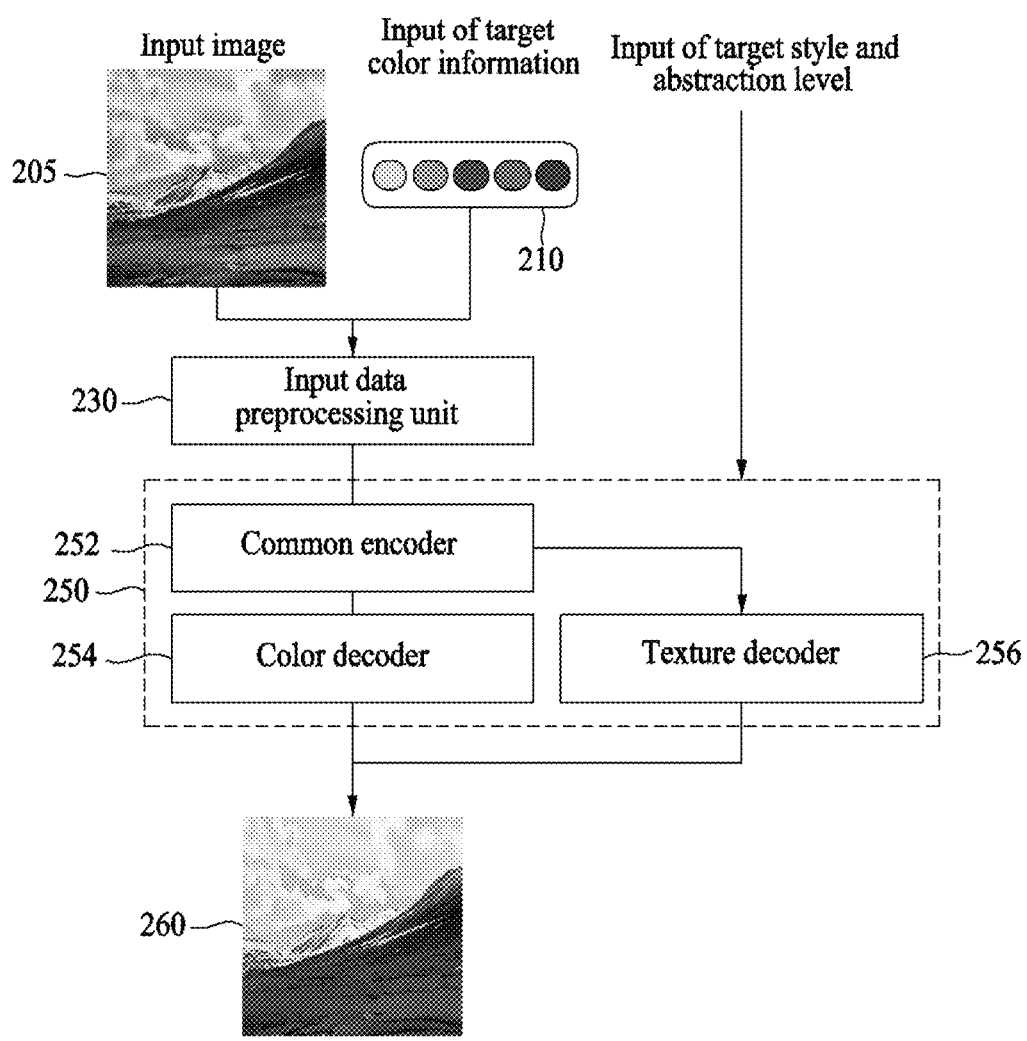
FIG. 2B is a block diagram illustrating an image transformation method performed using a pretrained transformation model according to at least one example embodiment.

In this regard, FIG. 2B illustrates an image transformation method performed using a pretrained transformation model according to at least one example embodiment.

A method of generating a result image 260 based on an input image 205, that is, a method of transforming the input image 205 to the result image 260 using a pretrained transformation model 250 is described with reference to FIG. 2B.

An input data preprocessing unit 230 and the transformation model 250 may be implemented using the processor 120. That is, an operation performed by the input data preprocessing unit 230 and the transformation model 250 may be an operation performed by the processor 120.

Referring to FIG. 2B, the input image 205 and target color information 210 may be input to the computer system 100. Also, an abstraction level that represents a target style and a degree of abstraction of the result image 260 may be further input to the computer system 100. The target color information 210 may be configured as a palette that includes a group of a plurality of different colors. Alternatively, the target color information 210 may also represent a single selected color.

The palette included in the target color information 210 may include a group of a plurality of different colors determined based on a color distribution of the input image 205. For example, the number of colors included in the palette and/or a type of each color may be determined based on the color distribution of the input image 205. The palette of the target color information 210 is illustrated as a group of colors that currently reflect the color distribution of the input image 205. That is, the illustrated palette may be a source palette. The number of colors included in the palette and/or types thereof may be determined based on the number of colors used in the input image 205 and/or types thereof.

For example, the user may select a palette that includes a group of other colors (e.g., a group of colors that represent a red tone as a whole) through the UI of the area 40 and may change the target color information 210. Alternatively, each of the plurality of colors included in the palette may be configured to be selectable by the user and the user may change each color included in the palette.

The input data preprocessing unit 230 may preprocess the input image 205 based on the target color information 210 and may generate data for input to the transformation model 250. A preprocessing method of the input image 205 is further described with reference to FIGS. 4A and 4B.

Data preprocessed by the input data preprocessing unit 230 may be input to the transformation model 250. The transformation model 250 may include a common encoder 252 configured to encode the preprocessed data of the input image 205. The transformation model 250 may include a texture decoder 256 configured to perform decoding for texture transformation on the encoded data and a color decoder 254 configured to perform decoding for color transformation on the encoded data. According to decoding by the texture decoder 256, a texture-transformed image in which the input image 205 is transformed to a texture corresponding to the target style may be generated. According to decoding by the color decoder 254, a color-transformed image in which the input image 205 is transformed to a color corresponding to the target color information 210. A texture transformation result by the transformation model 250 may include the target style input from the user and the degree of abstraction corresponding to the abstraction level. A detailed structure of the transformation model 250 is further described with reference to FIG. 7.

The computer system 100 may generate the result image 260 by synthesizing the texture transformation result and the color transformation result by the transformation model 250. Therefore, the texture of the input target style and the degree of abstraction corresponding to the abstraction level may be reflected in the generated result image 260, and the impression of color of the result image 260 may be the same as the input target color information 210.

Figure 13:
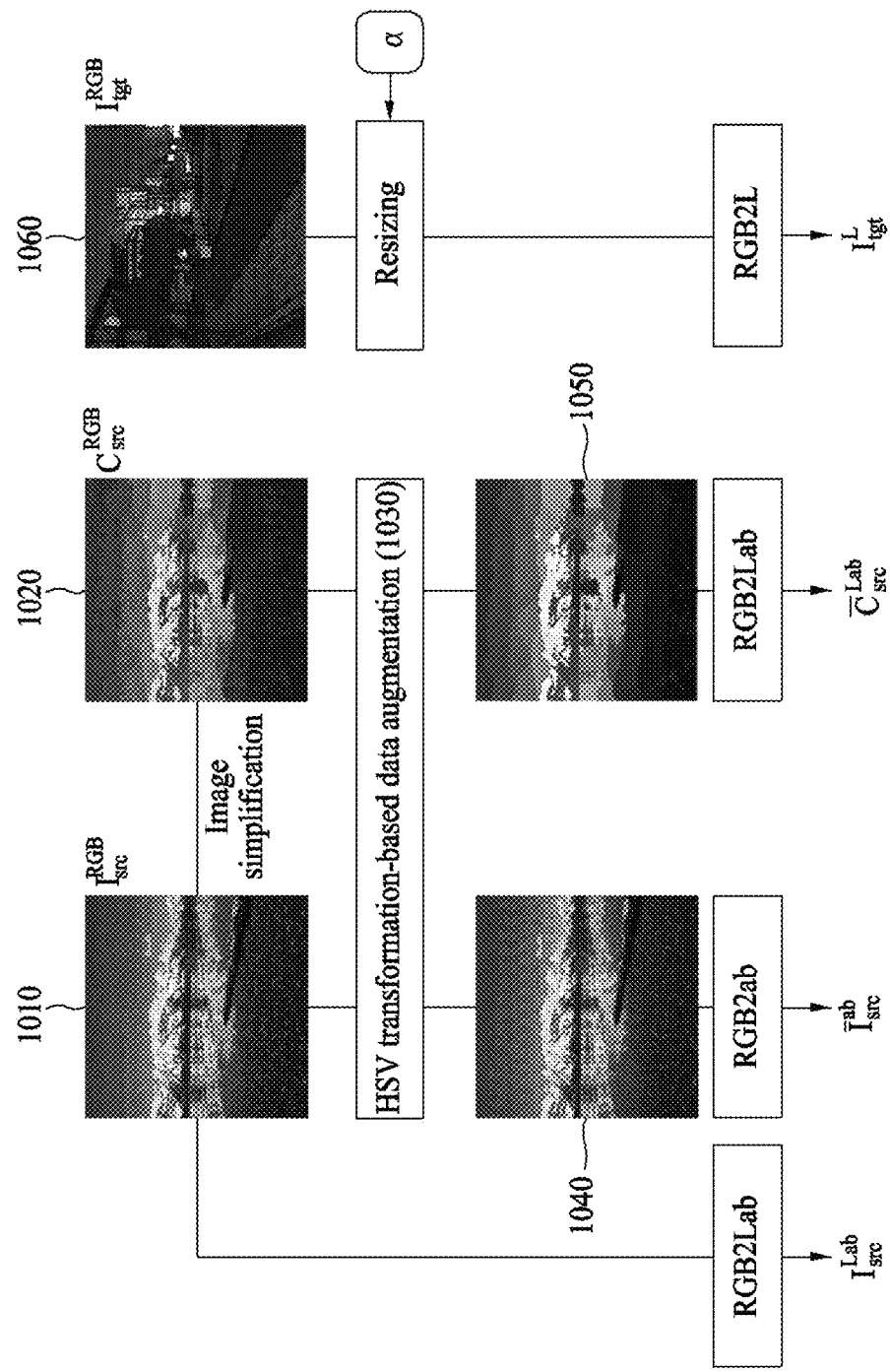
FIG. 13 is a diagram illustrating a result image that is generated based on an input image and reflects a target style and target color information according to at least one example embodiment.

In this regard, FIG. 13 illustrates a result image that is generated based on an input image and reflects a target style and target color information according to at least one example embodiment.

FIG. 13 illustrates a case in which an input image on the left is transformed to result images having a texture corresponding to a target style. A result image toward the right may have a higher abstraction level set. That is, a result image on the right may contain less detail and be expressed softly. Referring to FIG. 13, the result images may represent colors corresponding to input target color information 1310 to 1340. Each of the target color information 1310 to 1340 is illustrated as a palette that includes a group of a plurality of colors. The result images may be expressed with impression of colors represented by such a palette.

As described above, through the image transformation method of the example embodiment, the input image may be transformed to the result image that reflects the input target style, target color information, and abstraction level.

Description related to technical features made above with reference to FIG. 1 may apply to FIGS. 2A and 2B and FIG. 13 and thus, repeated description is omitted.

Hereinafter, the aforementioned method of transforming the input image 205 to the result image 260 using the transformation model 250 is further described.

In the following description, an operation performed by the computer system 100 or the processor 120 or components thereof may be explained as an operation performed by the computer system 100 for convenience of description.

FIG. 3 is a flowchart illustrating an image transformation method for generating a result image in which an input image is transformed based on a target style and target color information according to at least one example embodiment.

In operation 310, the computer system 100 may receive the input image 205, the target style to which the input image 205 is to be transformed, and the target color information 210 to which the input image 205 is to be transformed. For example, the computer system 100 may receive the input image 205, the target style, and the target color information 210 input from the user through a user terminal.

In operation 330, the computer system 100 may generate a texture-transformed image in which the input image 205 is transformed to a texture corresponding to the target style and may generate a color-transformed image in which the input image 205 is transformed to a color corresponding to the target color information 210, using the pretrained transformation model 250.

In operation 310, the computer system 100 may further receive, from the user through the user terminal, the abstraction level for setting the degree of abstraction to be represented by the result image 260. Therefore, the computer system 100 may generate the texture-transformed image by transforming the input image 205 to the texture corresponding to the target style that reflects the degree of abstraction represented by the received abstraction level.

In operation 330, the computer system 100 may generate the texture-transformed image and the color-transformed image to generate the result image 260 in which the input image 205 is transformed according to the received target style and target color information 210. For example, the computer system 100 may generate the result image 260 by coloring the texture-transformed image with the color of the color-transformed image. The texture-transformed image may also reflect the degree of abstraction represented by the received abstraction level.

As described above, the transformation model 250 of the example embodiment may distinguishably perform texture transformation on the input image 205 and color transformation on the input image 205. The transformation model 250 may be trained by separately calculating a loss function for each of the texture-transformed image and the color-transformed image before the result image 260 is generated.

In operation 340, the computer system 100 may output the result image 260 to the user terminal (e.g., the first area 10 of the screen 50).

The transformation model 250 of the example embodiment may be pretrained to transform the input image 205 to represent the texture corresponding to the target style and the color corresponding to the input target color information 210 without receiving an input of a reference image that represents the target style. That is, the transformation model 250 may generate the result image 260 based on the input image 205 without an additional input of a separate image having the texture of the target style in addition to the input image 205.

The input image 205 received in operation 310 may be preprocessed and then input to the transformation model 250. That is, in operation 320, the computer system 100 may preprocess the input image 205 to generate data suitable for being input to the transformation model 250. The aforementioned method of preprocessing the input image 205 is further described with reference to FIGS. 4A and 4B.

Description related to technical features made above with reference to FIG. 1, FIGS. 2A and 2B, and FIG. 13 may apply to FIG. 3 and thus, repeated description is omitted.

Figure 4A:
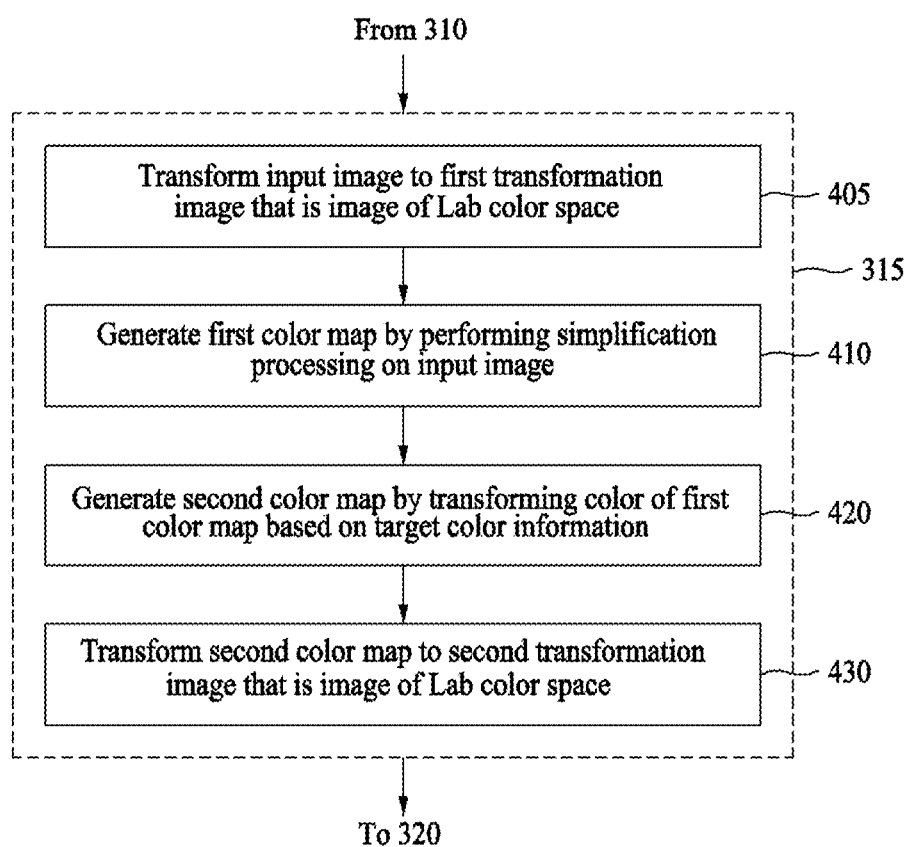
FIG. 4A is a flowchart illustrating a method of preprocessing an input image according to at least one example embodiment.
Figure 4B:
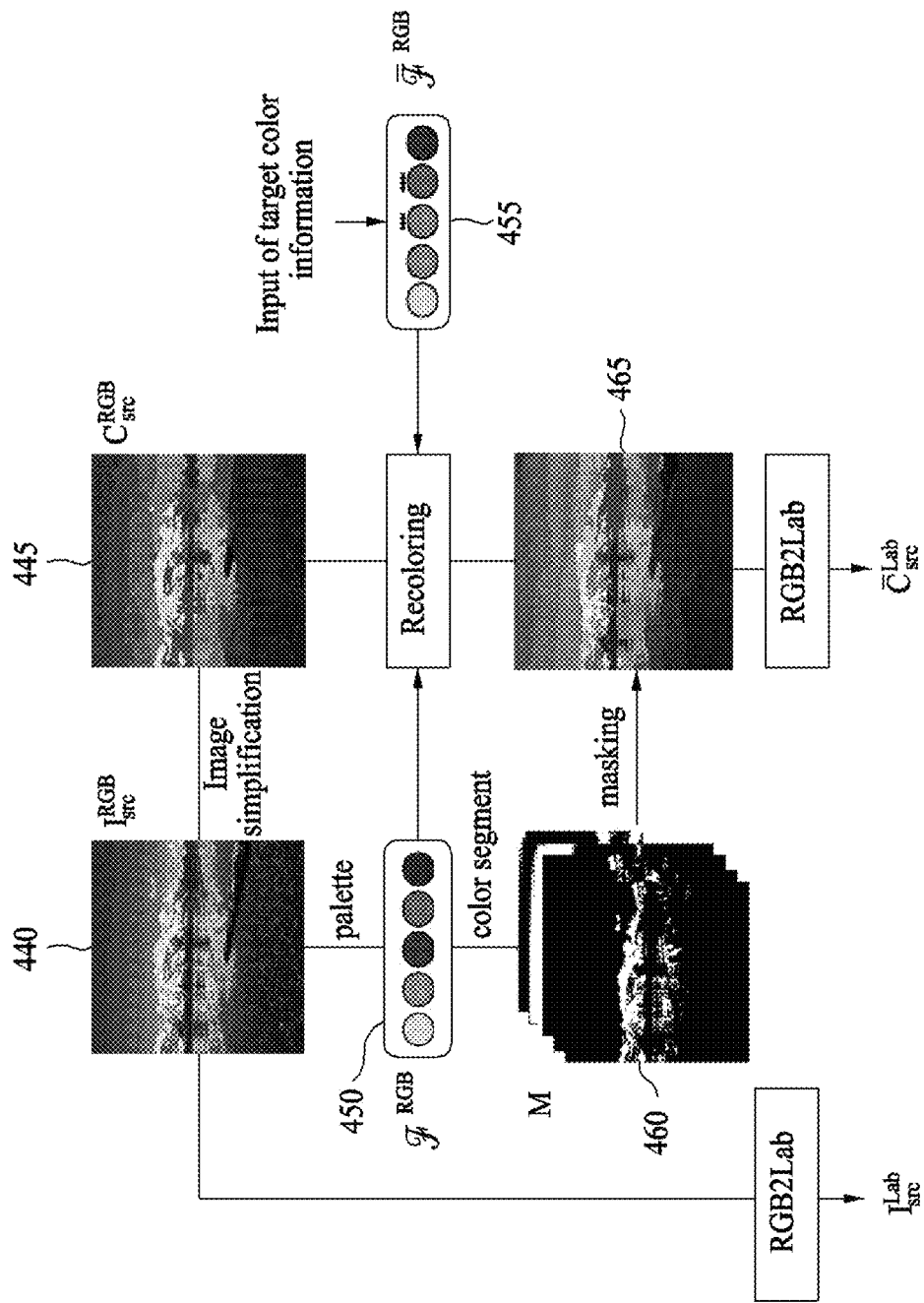
FIG. 4B is a diagram illustrating a method of preprocessing an input image according to one example embodiment.

FIGS. 4A and 4B illustrate a method of preprocessing an input image according to at least one example embodiment.

Referring to FIG. 4B, an input image 440 may correspond to the input image 205. The input image 440 may be, for example, an image of an RGB color space and may be expressed as $I_{src}^{RGB}$.

The computer system 100 may transform the input image 440 ($I_{src}^{RGB}$) to an image of a Lab color space (RGB2Lab). The Lab color space may be a color space that is expressed through a combination of a brightness (L) and red-green and yellow-blue (a Channel, b Channel). That is, an L component of the Lab color space may represent the brightness and an ab component of the Lab color space may represent a color. The input image 440 transformed to the image of the Lab color space may be expressed as $I_{src}^{Lab}$. $I_{src}^{Lab}$ may be input to the transformation model 250.

Also, the computer system 100 may generate a color map 445 corresponding to the input image 440 by performing image simplification processing on the input image 440 ($I_{src}^{RGB}$). The color map 445 may be expressed as $C_{src}^{RGB}$. Such image simplification processing may be performed based on a superpixel algorithm.

The color map 445 may be recolored based on target color information 455 input from a user. The computer system 100 may generate a source palette 450 ($\mathscr{P}^{RGB}$) of the input image 440 based on a color distribution of the input image 440. The source palette 450 ($\mathscr{P}^{RGB}$) may be generated based on a K-means clustering algorithm. The source palette 450 may also be referred to as an initial palette. The computer system 100 may generate a palette ($\mathscr{P}^{RGB}$) corresponding to the target color information 455 as the source palette 450 ($\mathscr{P}^{RGB}$) is edited by the user. For example, as at least one of colors that constitute the source palette 450 ($\mathscr{P}^{RGB}$) is modified in response to an input from the user, the palette ($\mathscr{P}^{RGB}$) corresponding to the target color information 455 may be generated. Since the color map 445 is recolored based on the palette ($\mathscr{P}^{RGB}$) corresponding to the target color information 455, a color map 465 ($\overline{C}_{src}^{RGB}$) that reflects the target color information 455 may be generated. Here, $\overline{C}_{src}^{RGB}$ may be transformed to an image of a Lab color space and a color map transformed to the image of the Lab color space may be expressed as $\overline{C}_{src}^{Lab}$. To maintain an unedited color map to be the same as the color map 445 ($C_{src}^{RGB}$) before the recoloring is performed, a color segmentation mask (M) 460 may be calculated for each color of the source palette 450 ($\mathscr{P}^{RGB}$) and masking using this mask may be performed for the input image 440 ($I_{src}^{RGB}$).

For example, an image mask M may be generated based on the input image 440 and the source palette 450 ($\mathscr{P}^{RGB}$). The computer system 100 may generate the mask by identifying a closest color from among colors in the source palette 450 ($\mathscr{P}^{RGB}$) in all pixels within the input image 440 and by filling a value in a mask area corresponding to the identified color. The color map 445 may be recolored using the palette ($\mathscr{P}^{RGB}$) corresponding to the target color information 455 and the source palette 450 ($\mathscr{P}^{RGB}$). Here, with respect to all pixels present in the color map 445, the computer system 100 may identify a color of the generated mask corresponding to each pixel and may recolor the color map 445 by comparing the identified color and the color of the palette ($\mathscr{P}^{RGB}$) corresponding to the target color information 455.

The color map $\overline{C}_{src}^{Lab}$ that is finally generated and transformed to the image of the Lab color space may be input to the transformation model 250.

Describing again the preprocessing method of the input image 440 with reference to FIG. 4A, the computer system 100 may transform the input image 440 to a first transformation image that is the image of the Lab color space in operation 405. The first transformation image may be the aforementioned $I_{src}^{Lab}$, and may be input to the transformation model 250.

In operation 410, the computer system 100 may generate a first color map by performing simplification processing on the input image 440. Simplification processing may employ, for example, simplification processing based on a superpixel algorithm and other simplification processing methods based on an image quantization algorithm. The first color map may correspond to the aforementioned color map 445 ($C_{src}^{RGB}$).

In operation 420, the computer system 100 may generate a second color map by transforming a color of the first color map based on received target color information. For example, the first color map may be recolored with a color corresponding to the target color information and the second color map may be generated according to such recoloring. The second color map may correspond to the aforementioned color map 465 ($\overline{C}_{src}^{RGB}$).

In operation 430, the computer system 100 may transform the second color map to a second transformation image that is the image of the Lab color space. The second transformation image generated according to such transformation may correspond to the aforementioned color map ($\overline{C}_{src}^{Lab}$), and may be input to the transformation model 250.

The transformation model 250 may generate the aforementioned texture-transformed image based on the first transformation image ($I_{src}^{Lab}$) and may generate the aforementioned color-transformed image based on the second transformation image ($\overline{C}_{src}^{Lab}$).

Description related to technical features made above with reference to FIGS. 1 to 3 and FIG. 13 may apply to FIGS. 4A and 4B and thus, repeated description is omitted.

Figure 5:
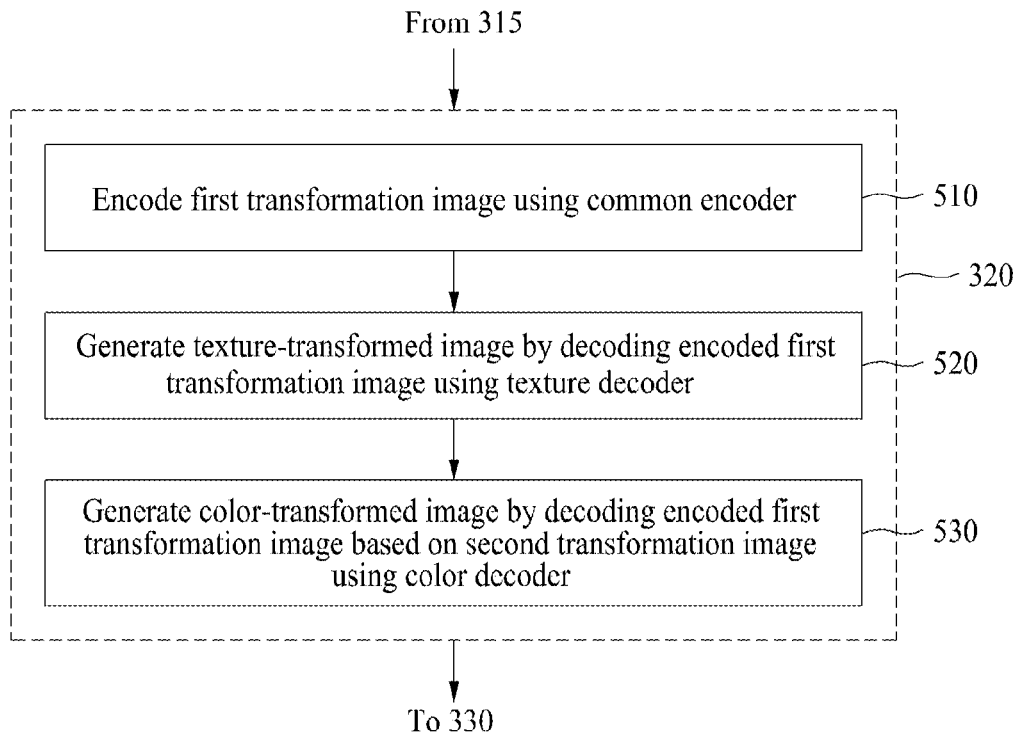
FIG. 5 is a flowchart illustrating a method of generating a texture-transformed image and a color-transformed image from an input image using a pretrained transformation model according to at least one example embodiment.

FIG. 5 is a flowchart illustrating a method of generating a texture-transformed image and a color-transformed image from an input image using a pretrained transformation model according to at least one example embodiment.

Hereinafter, a method of generating the aforementioned texture-transformed image and color-transformed image using the transformation model 250 is further described with reference to operations 510 to 530.

As described above with reference to FIG. 2B, the transformation model 250 may include the common encoder 252 configured to encode preprocessed data of the input image 440, the texture decoder 256 configured to perform decoding for texture transformation on the encoded data, and the color decoder 254 configured to perform decoding for color transformation on the encoded data.

In operation 510, the transformation model 250 may encode the first transformation image generated based on the aforementioned preprocessing of the input image 440 using the common encoder 252.

In operation 520, the transformation model 250 may generate the texture-transformed image by decoding the first transformation image encoded by the common encoder 252 using the texture decoder 256. The texture-transformed image may be acquired by transforming a texture of the input image 440 to a texture corresponding to the target style.

In operation 530, the transformation model 250 may generate a color-transformed image by decoding the encoded first transformation image using the color decoder 254, based on the second transformation image generated based on preprocessing of the input image 440, for example, by using the second transformation image as conditional information. As the aforementioned second transformation image is input to the color decoder 254, a color corresponding to the target color information may be reflected in the color-transformed image.

The computer system 100 may generate a final result image synthesizing the texture-transformed image generated in operation 520 and the color-transformed image generated in operation 530. In other words, the computer system 100 may generate the final result image by coloring the texture-transformed image with the color of the color-transformed image.

Description related to technical features made above with reference to FIG. 1 to FIGS. 4A and 4B and FIG. 13 may apply to FIG. 5 and thus, repeated description is omitted.

Figure 6:
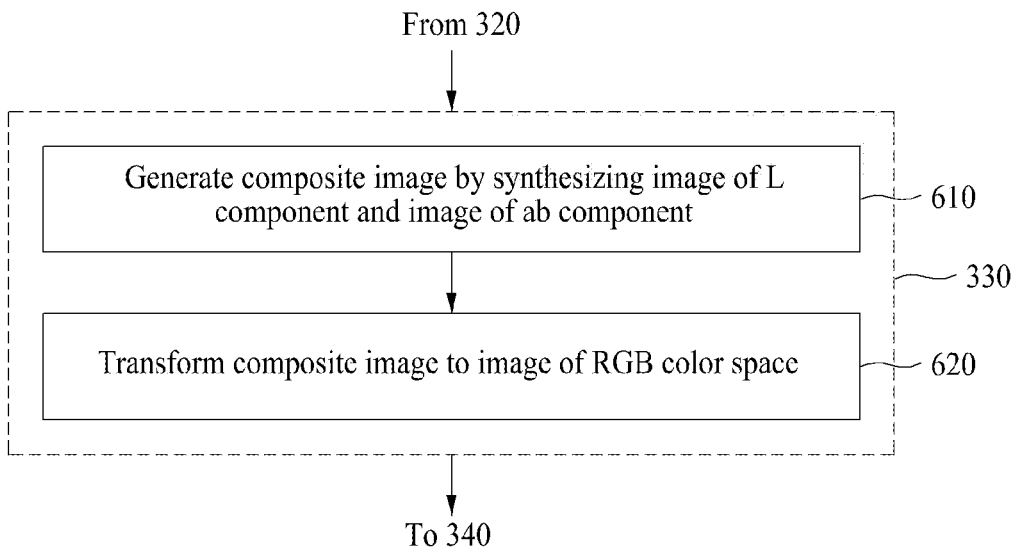
FIG. 6 is a flowchart illustrating a method of generating a result image according to at least one example embodiment.

FIG. 6 is a flowchart illustrating a method of generating a result image according to at least one example embodiment.

The texture-transformed image described above with reference to FIG. 5 may be an image of an L component as an image of a Lab color space. That is, the texture-transformed image may not have an ab component. The color-transformed image may be an image of the ab component as the image of the Lab color space. The color-transformed image may be a color map of an ab channel for generating a result image.

In operation 610, the computer system 100 may generate a composite image by synthesizing the image of the L component that is the texture-transformed image and the image of the ab component that is the color-transformed image. The composite image may be the image of the Lab color space.

In operation 620, the computer system 100 may transform the composite image that is the image of the Lab color space to an image of an RGB color space. A final image transformed to the image of the RGB color space may be the aforementioned result image.

Operations 610 and 620 may be performed by the transformation model 250.

Description related to technical features made above with reference to FIGS. 1 to 5 and FIG. 13 may apply to FIG. 6 and thus, repeated description is omitted.

Figure 7:
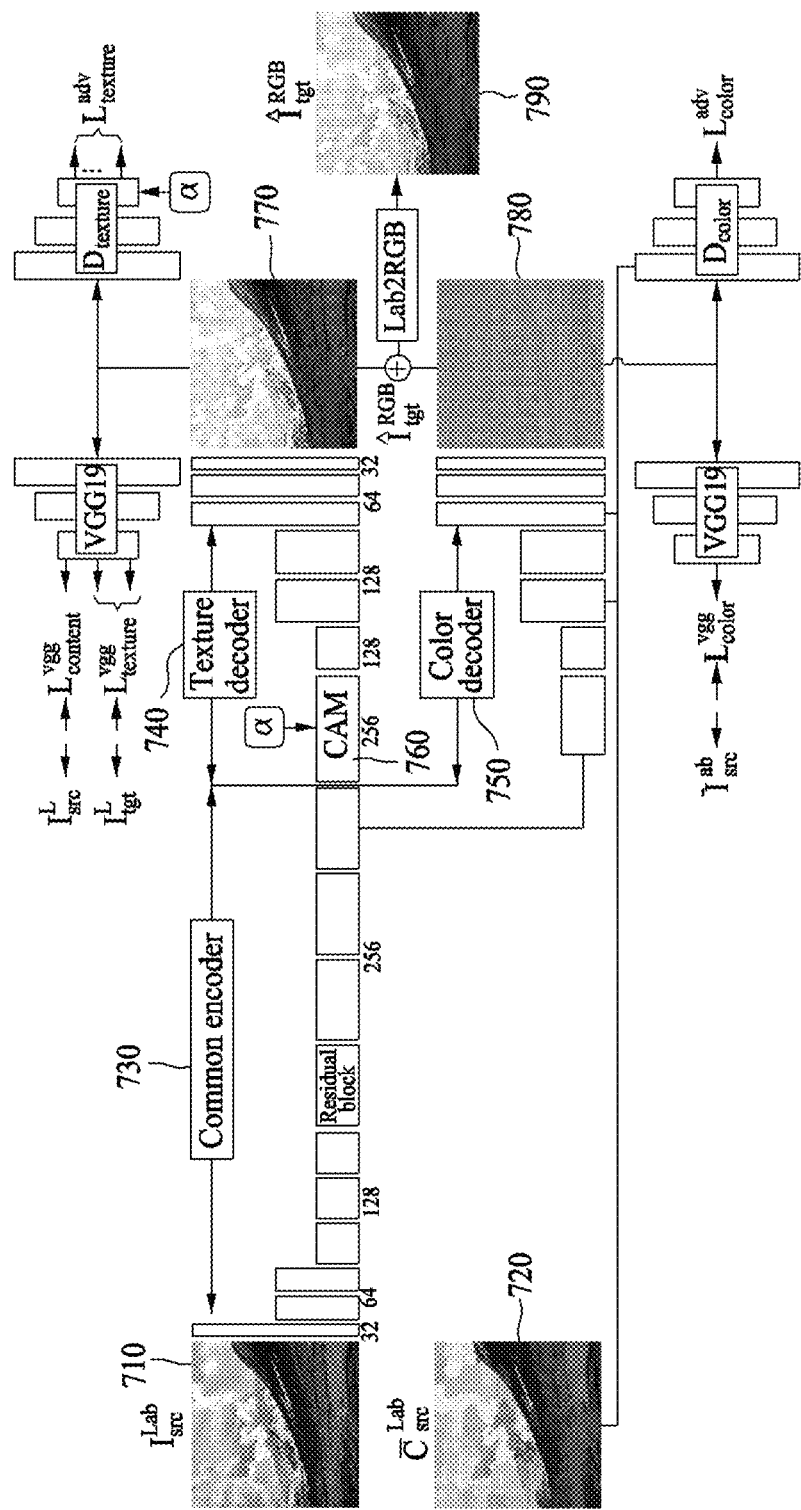
FIG. 7 is a diagram illustrating a transformation model for generating a result image in which an input image is transformed based on a target style and target color information according to at least one example embodiment.

FIG. 7 illustrates a transformation model for generating a result image in which an input image is transformed based on a target style and target color information according to at least one example embodiment.

The method of generating the texture-transformed image and the color-transformed image and the method of generating the result image described above with reference to FIGS. 5 and 6 are further described with reference to FIG. 7.

The transformation model of FIG. 7 may represent the transformation model 250. This transformation model may be an artificial intelligence (AI)-based model and may include, for example, a deep learning-based model. The transformation model may include a pretrained visual geometry group (VGG) model, for example, a VGG19 network.

The transformation model may include a common encoder 730, a texture decoder 740, and a color decoder 750.

The common encoder 730 may include a first transformation image 710 ($I_{src}^{Lab}$) that is data acquired by preprocessing the input image 440. The texture decoder 740 may generate a texture-transformed image 770 by decoding an encoding result by the common encoder 730. That is, the texture decoder 740 may generate an image that reflects a texture corresponding to a received target style. The generated texture-transformed image 770 may be an image of an L component of a Lab color space. Also, the texture-transformed image 770 generated by the texture decoder 740 may reflect a degree of abstraction represented by a received abstraction level.

To this end, the transformation model 250 may include a degree-of-abstraction module 760 configured with a plurality of layers, each layer that generates an output value of reflecting a degree of abstraction represented by each abstraction level. The degree-of-abstraction module 760 may be included in the texture decoder 740. That is, the texture decoder 740 may include the degree-of-abstraction module 760 and a plurality of convolutional layers.

Hereinafter, the degree-of-abstraction module 760 is further described with reference to FIG. 11.

Figure 11:
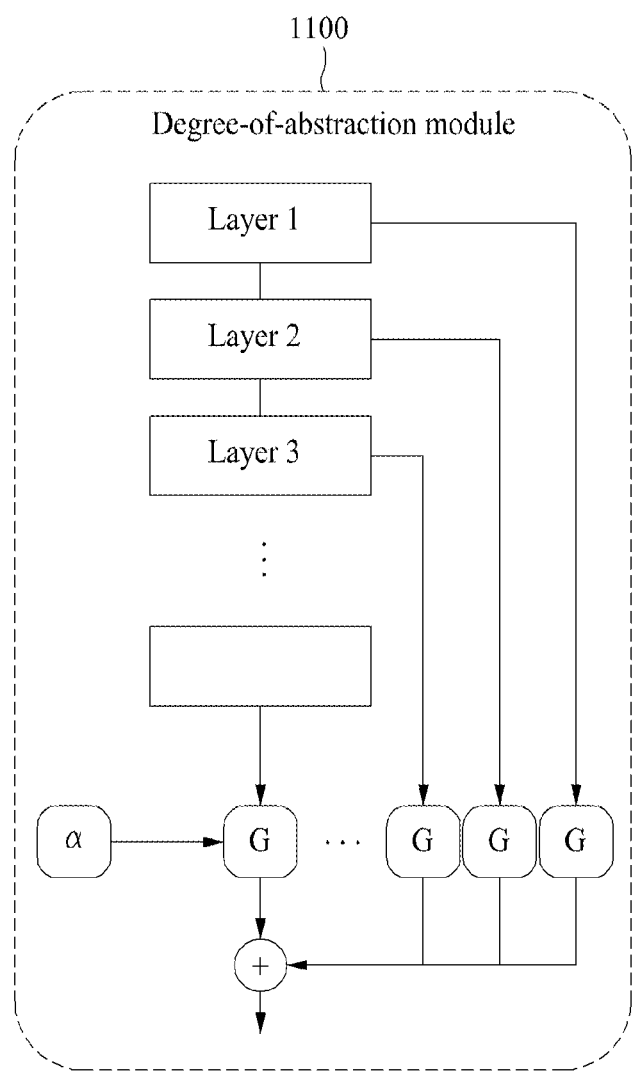
FIG. 11 is a diagram illustrating a structure of a degree-of-abstraction module included in a transformation model according to at least one example embodiment.

In this regard, FIG. 11 illustrates a structure of a degree-of-abstraction module included in a transformation model according to at least one example embodiment.

Referring to FIG. 11, a degree-of-abstraction module 1100 may represent the degree-of-abstraction module 760 in more detail. The degree-of-abstraction module 1100 may include a plurality of layers (or residual blocks) and gating modules G. Each layer may be configured to generate an output value that reflects a degree of abstraction represented by each abstraction level. The degree-of-abstraction module 1100 may also be referred to as a continuous abstraction module (CAM).

The transformation module 250, for example, the texture decoder 740 of the transformation module 250, may generate the texture-transformed image 770 by transforming the input image 440 to the texture corresponding to the target style that reflects the degree of abstraction represented by the received abstraction level using an output value of a layer of the degree-of-abstraction module 1100 corresponding to the abstraction level received from the user.

In the illustrated example, α may represent the received abstraction level. The degree-of-abstraction module 1100 may use an output value of a layer corresponding to the received abstraction level (α) among the layers to generate the texture-transformed image 770.

For example, the degree-of-abstraction module 1100 may determine a feature map generated in a layer (residual block) to be used according to the received abstraction level (α), may calculate the determined feature maps as a single final feature map through a sum operation, and may use the final feature map to generate the texture-transformed image 770.

Therefore, the generated texture-transformed image 770 may reflect not only the texture of the received target style but also the degree of abstraction represented by the received abstraction level.

The color decoder 750 may be configured with a residual block and a plurality of convolutional layers. The color decoder 750 may decode an encoding result by the common encoder 730 and here, may perform decoding by using a second transformation image 720 ($\overline{C}_{src}^{Lab}$) as an additional input and may generate a color-transformed image 780 in which a color corresponding to target color information is reflected. That is, the color decoder 750 may generate an image that reflects a color (impression of color, palette, etc.) corresponding to the received target color information. The generated color-transformed image 780 may be an image of an ab component of the Lab color space.

A result image 790 may be generated by synthesizing the texture-transformed image 770 and the color-transformed image 780. A composite image acquired by synthesizing the texture-transformed image 770 and the color-transformed image 780 may be referred to as $\hat{I}_{tgt}^{Lab}$. The composite image ($\hat{I}_{tgt}^{Lab}$) may be an image of the Lab color space and the composite image ($\hat{I}_{tgt}^{Lab}$) may be transformed to an image of an RGB color space. The transformed image of the RGB color space may be the result image 790 and the result image 790 may be referred to as $\hat{I}_{tgt}^{RGB}$.

As described above, the transformation model 250 may distinguishably generate the texture-transformed image 770 and the color-transformed image 780 using the texture decoder 740 and the color decoder 750, respectively, and may generate the result image 790 by synthesizing the texture-transformed image 770 and the color-transformed image 780.

Therefore, the final result image 790 may reflect the target style, the target generation information, and the degree of abstraction received from the user.

Description related to technical features made above with reference to FIGS. 1 to 6 and FIG. 13 may apply to FIGS. 7 and 11 and thus, repeated description is omitted.

Hereinafter, a method of constructing the pretrained transformation model 250 by training the transformation model 250 is further described with reference to FIG. 8 to FIGS. 10A and 10B.

Figure 8:
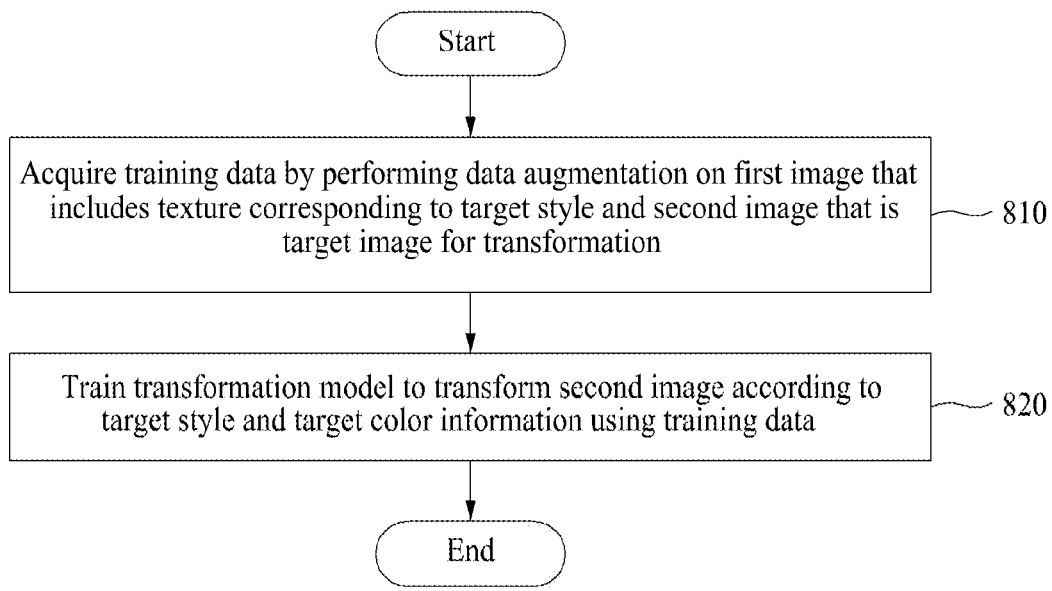
FIG. 8 is a flowchart illustrating a method of training a transformation model according to at least one example embodiment.

FIG. 8 is a flowchart illustrating a method of training a transformation model according to at least one example embodiment.

A computer system to train the transformation model 250 may be an apparatus or a server separate from the computer system 100. In the following, for clarity of description, example embodiments are described with the assumption that the computer system 100 is the same as the computer system to train the transformation model 250.

In operation 810, the computer system 100 may acquire training data by performing data augmentation on at least one first image that includes a texture corresponding to a target style and at least one second image that is a target image for transformation to the target style and color transformation. The first image may be, for example, an image included in content represented by the target style. For example, when the content is a webcomic, the first image may include cuts as images extracted from the webcomic. The second image may be an image to be transformed to the texture represented by the first image. The second image may include a photo or other picture images.

Each of the first image and the second image may include a plurality of images and may be processed and augmented into a form suitable for training the transformation model 250. The training data may represent data that is processed and augmented into a form suitable for training the transformation model 250.

For example, the transformation model 250 may be trained using first training data that is generated by performing data augmentation on the at least one first image that includes the texture corresponding to the target style and second training data that is generated by performing data augmentation on the at least one second image that is the target image for transformation to the corresponding target style and color transformation (according to arbitrary target color information). The aforementioned pretrained transformation model 250 may be pretrained using the first training data and the second training data.

A method of generating the first training data and the second training data by performing data augmentation on the first image and the second image is further described with reference to FIGS. 9A and 9B and FIGS. 10A and 10B.

In operation 820, the computer system 100 may train the transformation model 250 to generate a texture-transformed image in which the second image is transformed to the texture corresponding to the target style and a color-transformed image in which the second image is transformed to a color corresponding to target color information, using the acquired training data. By synthesizing the generated texture-transformed image and color-transformed image, a result image in which the second image is transformed according to the target style and the target color information may be generated.

The transformation model 250 trained through operation 820 may transform the input image (input from the user) to represent the texture corresponding to the target style and the color corresponding to the target color information (arbitrarily input from the user) without receiving an input of a reference image that represents the target style.

Description related to technical features made above with reference to FIGS. 1 to 7, FIG. 11, and FIG. 13 may apply to FIG. 8 and thus, repeated description is omitted.

Figure 9A:
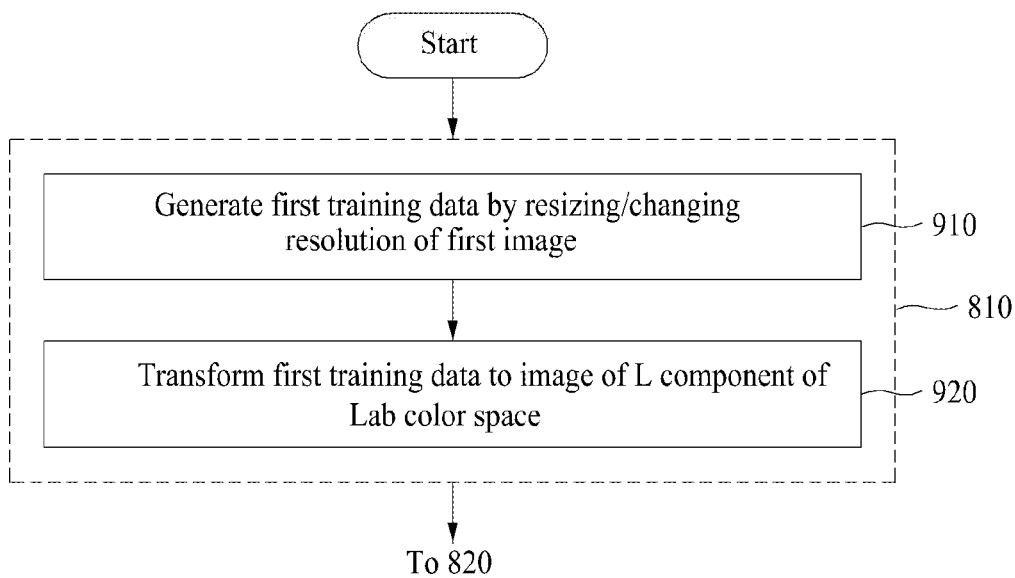
FIGS. 9A and 9B are flowcharts illustrating a method of acquiring training data for a transformation model according to at least one example embodiment.
Figure 9B:
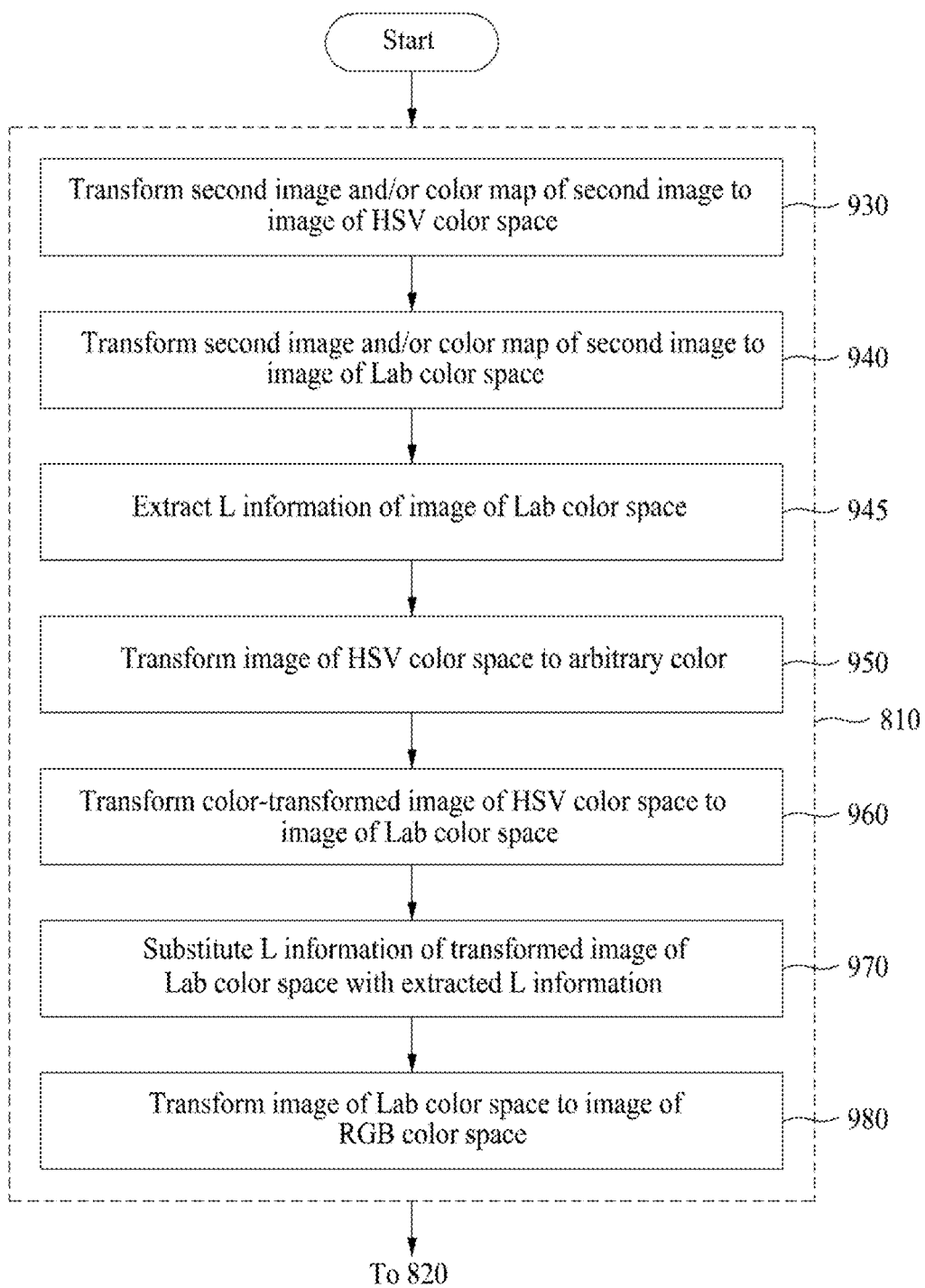

FIGS. 9A and 9B are flowcharts illustrating a method of acquiring training data for a transformation model according to at least one example embodiment.

Figure 10A:
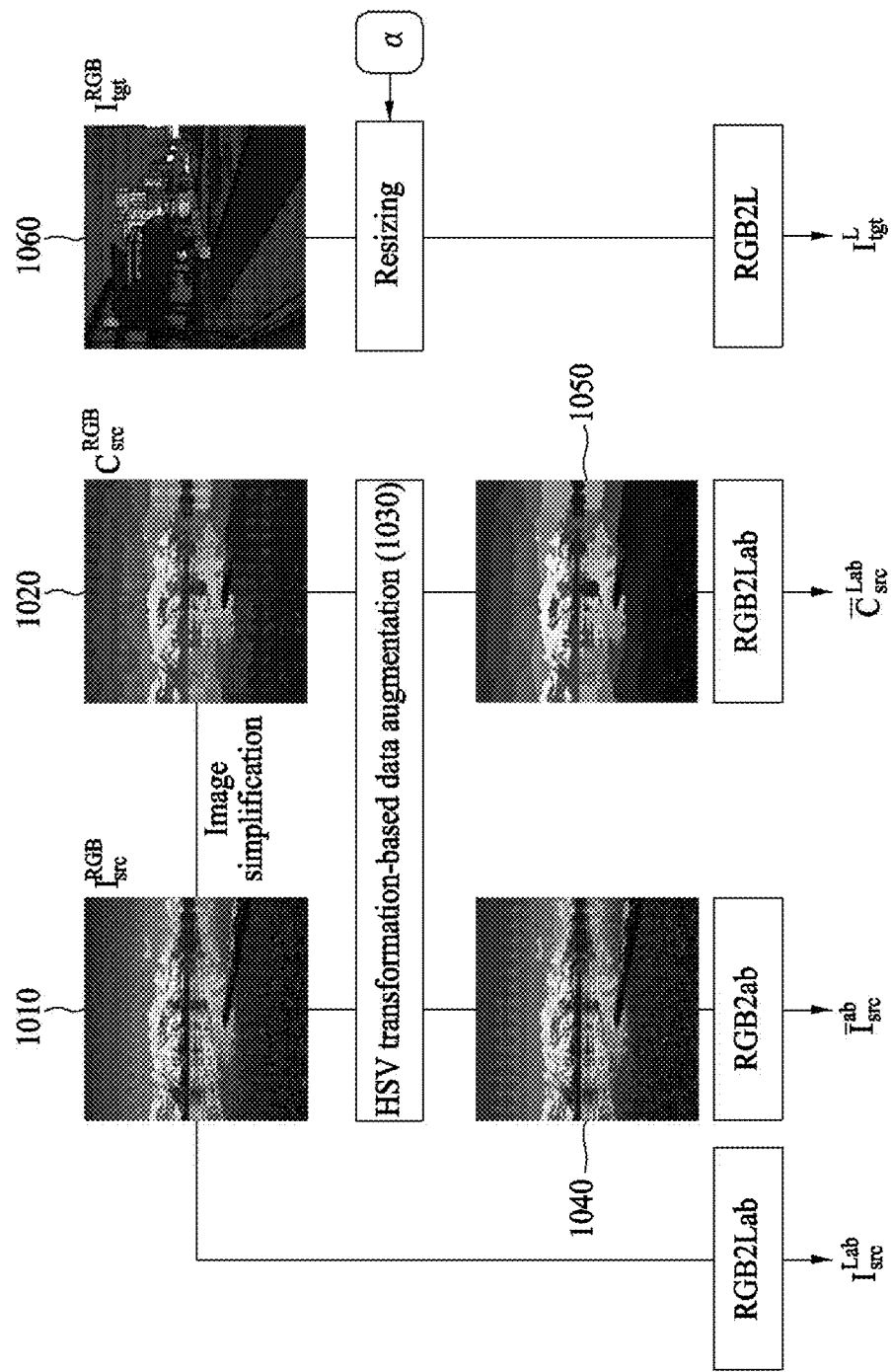
FIGS. 10A and 10B are diagrams illustrating a method of acquiring training data for a transformation model according to at least one example embodiment.
Figure 10B:
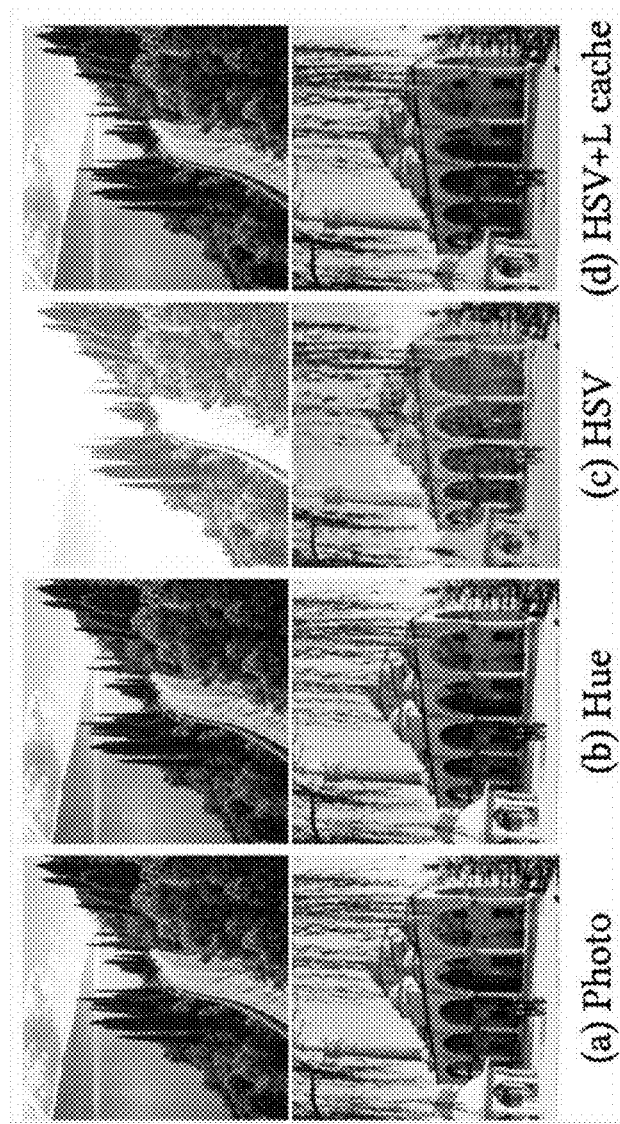

FIGS. 10A and 10B illustrate a method of acquiring training data for a transformation model according to at least one example embodiment. FIG. 10A illustrates operations described with reference to FIGS. 9A and 9B.

As described above, the transformation model 250 may be trained using first training data that is generated by performing data augmentation on at least one first image that includes a texture corresponding to a predetermined target style and second training data that is generated by performing data augmentation on at least one second image that is a target image for transformation to the corresponding target style and color transformation (according to arbitrary target color information).

A method of generating the first training data is further described with reference to FIG. 9A.

The first training data may need to include training image(s) for the transformation model 250 to generate a result image that reflects a degree of abstraction represented by an abstraction level. That is, the first training data may include training image(s) that simulate a predetermined degree of abstraction processing (i.e., processing that reflects a degree of abstraction represented by an arbitrary abstraction level) on the first image. The first training data may be generated by performing resizing processing and/or resolution change processing on the first image. That is, the first training data may include an image on which at least one of resizing processing and resolution change processing is performed, to simulate the predetermined degree of abstraction processing on the first image.

To generate the first training data, in operation 910, the computer system 100 may generate the first training data by performing resizing processing and resolution change processing on the first image. The computer system 100 may perform resizing processing and resolution change processing on the first image in consideration of various sizes and/or resolutions based on an arbitrary abstraction level and may generate the first training data that includes a plurality of images accordingly.

In operation 920, the computer system 100 may transform the generated first training data to an image of a Lab color space. For example, the computer system 100 may transform the first training data to an image of an L component of the Lab color space. The transformed image may be final first training data.

Describing a method of generating the first training data with reference to FIG. 10A, at least one first image 1060 that includes a texture corresponding to a predetermined target style may be expressed as $I_{tgt}^{RGB}$. Resizing and/or resolution change processing may be performed such that the first image 1060 ($I_{tgt}^{RGB}$) may simulate a predetermined degree of abstraction processing represented by an arbitrary abstraction level ($\alpha$) input from the user. Images generated according to resizing and/or resolution change processing may be an image of an RGB color space and the image of the RGB color space may be transformed to an image of an L component of a Lab color space. The finally generated first training data may be referred to as $I_{tgt}^{L}$. The first training data ($I_{tgt}^{L}$) may be input to the transformation model 250 described above with reference to FIG. 7 and may be used to calculate a loss function for implementing the transformation model 250 to simulate the texture of the target style.

A method of generating the second training data is further described with reference to FIG. 9B.

The second training data may include a transformation image for training in which a second image is color-transformed to an arbitrary color. The second training data may need to include training image(s) for the transformation model 250 to generate a result image that reflects a color corresponding to input target color information. That is, the second training data may include transformation image(s) for training that simulate arbitrary color change (i.e., processing of reflecting a color corresponding to arbitrary target color information) on the second image. The second training data including the transformation image(s) for training may be generated through the following operations 930 to 980 that are transformation operations.

In operation 930, the computer system 100 may transform at least one of the second image and a color map of the second image generated by performing simplification processing on the second image to an image of an HSV color space. Simplification processing, that is, image simplification processing may be performed based on, for example, a superpixel algorithm. The computer system 100 may transform all of the second image and the color map of the second image to the image of the HSV color space. The HSV color space may refer to a color space that is expressed by specifying a specific color using coordinates of hue, saturation, and value.

In operation 950, the computer system 100 may perform color transformation on the transformed image of the HSV color space to an arbitrary color. Here, the "arbitrary color" may correspond to arbitrary target color information that may be input from the user. The arbitrary color may be an arbitrarily selected color. The aforementioned transformation image(s) for training may be generated according to the color transformation in operation 950.

In operation 980, the computer system 100 may transform the transformation image(s) for training generated in operation 950 to an image of an RGB color space.

Meanwhile, in an example embodiment, the computer system 100 may generate more suitable second training data to train the transformation model 250 by correcting brightness information (L) of the transformation image(s) for training generated in operation 950. For example, in operation 940, the computer system 100 may further transform at least one of the second image and the color map of the second image generated by performing simplification processing on the second image. The computer system 100 may transform all of the second image and the color map of the second image to an image of a Lab color space. In operation 945, the computer system 100 may extract L information (L component) of the transformed image of the Lab color space. The extracted L information may be used to modify, for example, L information of a color-transformed image generated in operation 950. Extraction of the L information may also be referred to as caching of the L information. That is, in operation 960, the computer system 100 may transform the image of the HSV color space that is transformed to the arbitrary color in operation 950 to the image of the Lab color space. In operation 970, the computer system 100 may substitute the L information of the image of the Lab color space transformed in operation 960 with the L information (i.e., cached L information) extracted in operation 945. In operation 980, the computer system 100 may transform the image of the Lab color space that is a result of operation 970 to an image of an RGB color space. Therefore, in the transformation image(s) for training generated through operation 950, L information may be corrected to a more suitable value.

In this regard, FIG. 10B illustrates a difference between an image with L information corrected through operations 940 to 970 and an image without corrected L information. For example, images (c) of FIG. 10B represent images of an HSV color space and images (d) represent a case in which L information is corrected by the aforementioned method as the images of the HSV color space. Images (d) show that the corresponding images have more natural brightness. That is, the aforementioned method may suppress a sudden change in brightness and may prevent brightness information from being lost when performing image transformation to the HSV color space. Therefore, the transformation image for training in the case in which the L information is corrected may be more suitable for training the transformation model 250.

Therefore, the second training data suitable for training the transformation model 250 may be acquired through operations 930 to 980.

Describing a method of generating final second training data with reference to FIG. 10A, at least one second image 1010 that is a target image for transformation to a target style and color transformation to target color information may be expressed as $I_{src}^{RGB}$. The second image 1010 ($I_{src}^{RGB}$) may be transformed to a color map 1020 ($C_{src}^{RGB}$) through image simplification processing. The second image 1010 ($I_{src}^{RGB}$) and the color map 1020 ($C_{src}^{RGB}$) may be transformed to transformation images for training 1040 and 1050, respectively, according to an HSV transformation-based data augmentation process 1030. The HSV transformation-based data augmentation process 1030 may be performed through operations 930 to 980. The transformation image for training 1040 may be acquired by augmenting the second image 1010 ($I_{src}^{RGB}$) through arbitrary color change processing. The transformation image for training 1050 may be acquired by augmenting the color map 1020 ($C_{src}^{RGB}$) through arbitrary color change processing. The transformation images for training 1040 and 1050 may be images of the RGB color space. The transformation image for training 1040 may be transformed to an image of an ab component of the Lab color space. Also, the transformation image for training 1050 may be transformed to the image of the Lab color space. The finally generated second training data may also be referred to $\bar{I}_{src}^{ab}$ that is generated from the transformation image for training 1040 and $\bar{C}_{src}^{Lab}$ that is generated from the transformation image for training 1050. The second training data ($\bar{C}_{src}^{Lab}$) may be input to the transformation model 250 described above with reference to FIG. 7 and may be input to the color decoder 750 of the transformation model 250. The second training data ($\bar{I}_{src}^{ab}$) may be input to the transformation model 250, and may be used to calculate a loss function for implementing the transformation model 250 to generate a result image that reflects the color of the target color information.

In one embodiment, the second image 1010 ($I_{src}^{RGB}$) itself may be training data for the transformation model 250. The second image 1010 ($I_{src}^{RGB}$) may be transformed to the image of the Lab color space and the transformed image ($I_{src}^{Lab}$) may be input to the transformation model 250.

That is, the transformation model 250 may be trained using an image ($I_{tgt}^{L}$) acquired by transforming the first training data to the image of the L component of the Lab color space (i.e., final first training data), an image ($I_{src}^{Lab}$) acquired by color-transforming the second image 1010 to the image of the Lab color space, an image ($\bar{I}_{src}^{ab}$) acquired by transforming the image color-transformed from the second image 1010 to an arbitrary color to the image of the ab component of the Lab color space, and an image ($\bar{C}_{src}^{Lab}$) acquired by transforming the color map 1020 of the second image 1010 to the image of the Lab color space. The "image" described in training data and example embodiments is used as a meaning that encompass data representing an image.

Description related to technical features made above with reference to FIGS. 1 to 8, FIG. 11, and FIG. 13 may apply to FIGS. 9A and 9B and FIGS. 10A and 10B and thus, repeated description is omitted.

Figure 12:
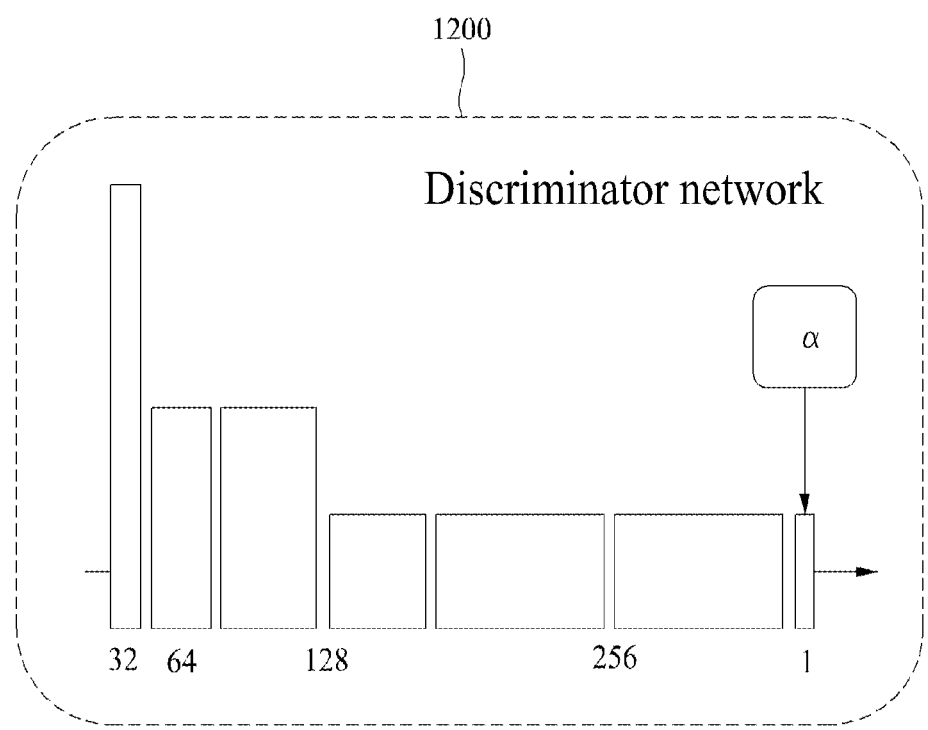
FIG. 12 is a diagram illustrating a structure of a discriminator network according to at least one example embodiment.

FIG. 12 illustrates a structure of a discriminator network according to at least one example embodiment.

A discriminator network 1200 may be a discriminator included in the transformation model 250. The transformation model 250 may be implemented through adversarial training using the discriminator network 1200.

The transformation model 250 may be trained using five loss functions.

The five loss functions may be referred to as $L_{content}^{vgg}$, $L_{texture}^{vgg}$, $L_{color}^{vgg}$, $L_{texture}^{adv}$, and $L_{color}^{adv}$, respectively.

Here, $L_{texture}^{adv}$ and $L_{color}^{adv}$ may represent adversarial loss functions of the discriminator network 1200. The adversarial loss functions may be used for the aforementioned texture decoder 740 and the color decoder 750. Meanwhile, $L_{content}^{vgg}$, $L_{texture}^{vgg}$, and $L_{color}^{vgg}$ may be loss functions for comparing an input image and/or a target image (an image having a texture of a target style).

Also, $L_{content}^{vgg}$, $L_{texture}^{vgg}$, and $L_{texture}^{adv}$ may be loss functions related to texture transformation and $L_{color}^{vgg}$ and $L_{color}^{adv}$ may be loss functions related to color transformation.

After a result generated by the texture decoder 740 passes through a VGG network, a restoration loss function for an image (e.g., the second image) may be calculated. After a feature map that passes through the VGG network has a Gram matrix calculated, a loss function with a Gram matrix corresponding to an image corresponding to the target style may be calculated.

After a result generated by the color decoder 750 passes through the VGG network, a loss function with an image ($\bar{I}_{src}^{ab}$) that goes through a color data augmentation process may be calculated. A result image that reflects colors corresponding to a variety of target color information input from the user through such loss functions may be generated.

Each loss function is further described below.

Initially, the loss function of the texture decoder 740 is described.

$L_{texture}^{adv}$ may represent an adversarial loss for the transformation model 250 to simulate a texture (e.g., texture of a cartoon domain) corresponding to the target style and may be expressed as Equation 1.

$$L_{texture}^{adv} = \log D_\alpha(I_{tgt}^L) + \log(1 - D_\alpha(G(I_{src}^{Lab}, \alpha))) \quad \text{[Equation 1]}$$

In Equation 1, G may represent a network for texture transformation (i.e., a cartoonization network) and $D_\alpha$ to a given abstraction factor (abstraction level) $\alpha$ may be a multi-abstraction discriminator.

$L_{content}^{vgg}$ may represent a content loss for a texture-transformed image (i.e., a cartoonized image) to maintain semantic information of an original image and may be expressed as Equation 2.

$$L_{content}^{vgg} = \|VGG(I_{src}^L) - VGG(G(I_{src}^{Lab}, \alpha))\|_1. \quad \text{[Equation 2]}$$

A conv4_4 layer of a VGG19 network pretrained to calculate Gram matrices may be used for the transformation model 250.

Also, the network for texture transformation (i.e., cartoonization network) may be configured to learn a high-level texture surface through a Gram-based loss expressed as Equation 3 below.

$$L_{texture}^{vgg} = \|Gram(VGG(I_{tgt}^L)) - Gram(VGG(G(I_{src}^{Lab}, \alpha)))\|_1 \quad \text{[Equation 3]}$$

Meanwhile, a final variation loss for assigning spatial smoothness to an output may be expressed as Equation 4 below.

$$L_{texture}^{tv} = \|\nabla x(G(I_{src}^{Lab}, \alpha)) + \nabla y(G(I_{src}^{Lab}, \alpha))\|_1 \quad \text{[Equation 4]}$$

For balancing parameters $\lambda_t^1, \cdots, ^4$, the final loss function of the texture decoder 740 may be expressed as Equation 5.

$$L_{texture} = \lambda_t^1 * L_{texture}^{adv} + \lambda_t^2 * L_{content}^{vgg} + \lambda_t^3 * L_{texture}^{vgg} + \lambda_t^4 * L_{texture}^{tv} \quad \text{[Equation 5]}$$

Subsequently, the loss function of the color decoder 750 is described.

An adversarial loss and a perceptual color loss may be used. The adversarial loss ($L_{color}^{adv}$) may be the same as the description made in relation to the texture decoder 740 and may differ only in that the color map ($\bar{C}_{src}^{Lab}$) is injected as conditional information. The adversarial loss may be expressed as Equation 6.

$$L_{color}^{adv} = \log D(\bar{I}_{src}^{ab}) + \log(1 - D(G(I_{src}^{Lab}, \bar{C}_{src}^{Lab}))) \quad \text{[Equation 6]}$$

D may be a discrimination network (discriminator) of color transformation, and G may represent a network for color transformation.

The perceptual loss, that is, the perceptual color loss may be a plain VGG-based distance. The generated image and a ground-truth (GT) image may be images of an ab color space and thus, may need to be transformed to an RGB color space again before being input to the VGG network. Images of an ab channel may be combined with $I_{src}^L$ that is a brightness image extracted from an original image. Output from the color decoder 750 may be referred to as $\hat{I}_{src}^{ab}$, and $\hat{I}_{src}^{ab}=G(I_{src}^{Lab}, \overline{C}_{src}^{Lab})$. The perceptual color loss ($L_{color}^{vgg}$) may be calculated as Equation 7.

$$\overline{I}_{src}^{RGB}=\text{Lab2RGB}(I_{src}^L, \overline{I}_{src}^{ab})$$

$$\hat{I}_{src}^{RGB}=\text{Lab2RGB}(I_{src}^L, \hat{I}_{src}^{ab})$$

$$L_{color}^{vgg}=\|\text{VGG}(\overline{I}_{src}^{RGB})-\text{VGG}(\hat{I}_{src}^{RGB})\|_1 \quad \text{[Equation 7]}$$

The final loss function of the color decoder 750 may be expressed as Equation 8.

$$L_{color}=\lambda_c^1 * L_{color}^{adv}+\lambda_c^2 * L_{color}^{vgg} \quad \text{[Equation 8]}$$

Lambda may represent balancing parameters.

The overall framework of the transformation model 250 may be trained in an end-to-end manner using the final loss. The overall loss may be $L=L_{texture}+L_{color}$.

Description related to technical features made above with reference to FIGS. 1 to 11 and FIG. 13 may apply to FIG. 12 and thus, repeated description is omitted.

The apparatuses described herein may be implemented using hardware components, software components, and/or combination of the hardware components and the software components. For example, the apparatuses and components described herein may be implemented using one or more computers or processing devices, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to be performed through various computer methods. Here, the media may continuously store a computer-executable program or may temporarily store the same for execution or download. Also, the media may be various recording devices or storage devices in which a single piece of hardware or a plurality of hardware is combined and may be distributed over a network without being limited to media directly connected to a computer system. Examples of non-transitory computer-readable media include magnetic media such as hard disks, floppy disks, and magnetic tapes; optical media such as CD ROM disks and DVDs; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image transformation method performed by a computer system, the image transformation method comprising:
   receiving, from a user, an input image, a target style to which the input image is to be transformed, and target color information to which the input image is to be transformed;
   generating, responsive to the receipt of the input image, the target style and the target color information from the user, a texture-transformed image in which the input image is transformed to a texture corresponding to the target style and a color-transformed image in which the input image is transformed to a color corresponding to the target color information, using a pre-trained transformation model; and
   synthesizing the texture-transformed image and the color-transformed image to generate a result image in which the input image is transformed according to the target style and the target color information,
   wherein the generating of the texture-transformed image and the color-transformed image respectively includes,
   using a texture decoder of the transformation model to generate the texture-transformed image based on the input image in which a texture corresponding to the target style is applied; and
   using a color decoder of the transformation model to generate the color-transformed image based on the input image in which a color corresponding to the target color is applied.

2. The image transformation method of claim 1, wherein the transformation model is pretrained to transform the input image to represent the texture corresponding to the target style and the color corresponding to the input target color information without receiving an input of a reference image that represents the target style.

3. The image transformation method of claim 1, wherein the target color information includes a palette including a group of a plurality of different colors determined based on a color distribution of the input image.

4. The image transformation method of claim 3, wherein each of the plurality of different colors is configured to be selectable by a user.

5. The image transformation method of claim 1, wherein the target style represents content that includes an image or a video, and
the texture corresponding to the target style is a texture of the image or the video included in the content.

6. The image transformation method of claim 1, wherein the receiving of the input image, a target style and target color information comprises receiving, from the user, an abstraction level for setting a degree of abstraction to be represented by the result image, and
the texture-transformed image is generated by transforming the input image to the texture corresponding to the target style that reflects the degree of abstraction represented by the abstraction level.

7. The image transformation method of claim 1, further comprising:
an operation of preprocessing the input image including,
transforming the input image to a first transformation image that is an image of a Lab color space;
generating a first color map by performing simplification processing on the input image;
generating a second color map by transforming a color of the first color map based on the target color information; and
transforming the second color map to a second transformation image that is an image of the lab color space,
wherein the first transformation image and the second transformation image are input to the transformation model, and
the texture-transformed image is generated based on the first transformation image and the color-transformed image is generated based on the second transformation image.

8. The image transformation method of claim 7, wherein the generating of the texture-transformed image and the color-transformed image by the transformation model includes,
encoding the first transformation image using an encoder;
generating the texture-transformed image by decoding the encoded first transformation image using the texture decoder; and
generating the color-transformed image by decoding the encoded first transformation image based on the second transformation image using the color decoder.

9. The image transformation method of claim 1, wherein the texture-transformed image is an image of an L component as an image of a Lab color space, and
the color-transformed image is an image of an ab component as the image of the Lab color space, and
the synthesizing of the texture-transformed image and the color-transformed image the comprises:
generating a composite image by synthesizing the image of the L component and the image of the ab component; and
transforming the composite image to an image of an RGB color space.

10. The image transformation method of claim 6, wherein the transformation model comprises a degree-of-abstraction module configured with a plurality of layers, each layer generating an output value of reflecting a degree of abstraction represented by each abstraction level, and
the texture-transformed image is generated by transforming the input image to the texture corresponding to the target style that reflects the degree of abstraction represented by the received abstraction level, using an output value of a layer of the degree-of-abstraction module corresponding to the received abstraction level.

11. The image transformation method of claim 1, wherein the transformation model is pretrained using first training data generated by performing data augmentation on at least one first image that includes the texture corresponding to the target style and second training data generated by performing data augmentation on at least one second image that is a target image for transformation to the target style and color transformation.

12. The image transformation method of claim 11, wherein the first training data includes an image on which at least one of resizing processing and resolution change processing is performed, to simulate a desired degree of abstraction processing for the first image.

13. The image transformation method of claim 11, wherein the second training data includes a transformation image for training in which the second image is color-transformed to an arbitrary color.

14. The image transformation method of claim 13, wherein the transformation image is generated by transformation operations, and
the transformation operations comprise:
an operation of transforming at least one of the second image and a color map of the second image generated by performing simplification processing on the second image to an image of a hue saturation value (HSV) color space; and
an operation of color-transforming the image of the HSV color space to an arbitrary color.

15. The image transformation method of claim 14, wherein the transformation operations further comprise:
an operation of transforming at least one of the second image and the color map of the second image to an image of a Lab color image;
an operation of extracting L information of the image of the Lab color image;
an operation of transforming the image of the HSV color space that is color-transformed to the arbitrary color to the image of the Lab color image; and
an operation of substituting L information of the transformed image of the Lab color space with the extracted L information.

16. The image transformation method of claim 13, wherein the transformation model is pretrained using an image acquired by transforming the first training data to an L component of an image of a Lab color space, an image acquired by transforming the second image to the image of the Lab color space, an image acquired by transforming an image in which the second image is color-transformed to the arbitrary color to an image of an ab component of the Lab color space, and an image acquired by transforming a color map of the second image to the image of the Lab color space.

17. A non-transitory computer-readable recording medium storing instructions that, when executed by a processor, cause the processor to perform the image transformation method of claim 1 on the computer system.

18. A computer system to perform an image transformation method, the computer system comprising:
at least one processor configured to execute instructions readable in the computer system,
wherein the at least one processor is configured to:
receive, from a user, an input image, a target style to which the input image is to be transformed, and target color information to which the input image is to be transformed, generate, responsive to the receipt of the input image, the target style and the target color information from the user, a texture-transformed image in which the input image is transformed to a texture corresponding to the target style and a color-transformed image in which the input image is transformed to color corresponding to the target color information, using a pretrained transformation model, and synthesize the texture-transformed image and the color-transformed image to generate a result image in which the input image is transformed according to the target style and the target color information, wherein the generating of the texture-transformed image and the color-transformed image respectively includes, using a texture decoder of the transformation model to generate the texture-transformed image based on the input image in which a texture corresponding to the target style is applied; and using a color decoder of the transformation model to generate the color-transformed image based on the input image in which a color corresponding to the target color is applied.

19. A method of training a transformation model that transforms an image, performed by a computer system, the method comprising:

generating first training data by performing data augmentation on at least one first image that includes a texture corresponding to a target style and generating second training data by performing data augmentation on at least one second image that is a target image for transformation to the target style and color transformation, the second training data including a transformation image for training in which the second image is color-transformed to an arbitrary color; and training the transformation model to generate a texture-transformed image in which the second image is transformed to the texture corresponding to the target style and a color-transformed image in which the second image is transformed to a color corresponding to target color information, using the training data, wherein a result image in which the second image is transformed according to the target style and the target color information is generated by synthesizing the texture-transformed image and the color-transformed image, the transformation image is generated by transformation operations including an operation of transforming at least one of the second image and a color map of the second image generated by performing simplification processing on the second image to an image of a hue saturation value (HSV) color space, and an operation of color-transforming the image of the HSV color space to the arbitrary color, and the trained transformation model is configured to transform an input image to represent the texture corresponding to the target style and the color corresponding to the input target color information without receiving an input of a reference image that represents the target style.

* * * * *